(12) United States Patent
Iio et al.

(10) Patent No.: US 10,538,099 B2
(45) Date of Patent: Jan. 21, 2020

(54) INKJET RECORDING APPARATUS, PRINTER, AND METHOD FOR MANUFACTURING CURED PRODUCT

(71) Applicants: Masato Iio, Kanagawa (JP); Takahiro Yoshida, Ibaraki (JP)

(72) Inventors: Masato Iio, Kanagawa (JP); Takahiro Yoshida, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/823,733

(22) Filed: Nov. 28, 2017

(65) Prior Publication Data
US 2018/0154657 A1    Jun. 7, 2018

(30) Foreign Application Priority Data

Dec. 2, 2016 (JP) ................................. 2016-235282
Nov. 7, 2017 (JP) ................................. 2017-214818

(51) Int. Cl.
*B41J 2/18* (2006.01)
*B41J 2/175* (2006.01)
*B41J 2/14* (2006.01)

(52) U.S. Cl.
CPC .............. *B41J 2/18* (2013.01); *B41J 2/1753* (2013.01); *B41J 2002/14403* (2013.01); *B41J 2202/12* (2013.01)

(58) Field of Classification Search
CPC ...... B41J 11/002; B41J 29/38; B41J 2/17513; B41J 2/14274; B41J 2/04563; B41J 2/18; B41J 2/14233; B41J 2/04531; B41J 2002/17516; B41J 2002/14403; B41J 2202/12; C09D 4/06; C09D 11/30; C09D 11/101

See application file for complete search history.

(56) References Cited

U.S. PATENT DOCUMENTS 5,406,318 A * 4/1995 Moore ................ B41J 2/155
                                                205/645
2008/0165237 A1   7/2008 Yamauchi et al.
2011/0007116 A1   1/2011 Ohgaki
(Continued)

FOREIGN PATENT DOCUMENTS

CN    103450746 A    12/2013
CN    103517953 A    1/2014
(Continued)

OTHER PUBLICATIONS

H. B. Van Der Walle, et al., "Sensitizing potential of 14 mono (meth) acrylates in the guinea pig" Contact Dermatitis 1982: 8: pp. 223-235.
(Continued)

*Primary Examiner* — Henok D Legesse
(74) *Attorney, Agent, or Firm* — Oblon, McClelland, Maier & Neustadt, L.L.P.

(57) ABSTRACT

An inkjet recording apparatus is provided. The inkjet recording apparatus includes a curable ink and a discharge head. The curable ink comprises a polymer having a polyester structural unit. The discharge head includes an individual liquid chamber including a circulation channel in which the curable ink is circulatable, and a nozzle from which the curable ink is dischargeable.

11 Claims, 12 Drawing Sheets

(56) References Cited

U.S. PATENT DOCUMENTS

| | | | |
|---|---|---|---|
| 2013/0321539 A1* | 12/2013 | Hiraoka | C09D 11/30 347/86 |
| 2014/0125744 A1 | 5/2014 | Hiraoka | |
| 2014/0146101 A1* | 5/2014 | Sakurada | B41J 2/04503 347/10 |
| 2014/0327719 A1 | 11/2014 | Hiraoka | |
| 2015/0062255 A1 | 3/2015 | Sasaki | |
| 2015/0097903 A1 | 4/2015 | Iijima | |
| 2015/0232677 A1 | 8/2015 | Hiraoka | |
| 2016/0032118 A1 | 2/2016 | Morris et al. | |
| 2017/0096015 A1 | 4/2017 | Odaka et al. | |
| 2017/0190179 A1* | 7/2017 | Menzel | B41J 2/14209 |

FOREIGN PATENT DOCUMENTS

| | | |
|---|---|---|
| CN | 103547640 A | 1/2014 |
| CN | 104144788 A | 11/2014 |
| CN | 105339444 A | 2/2016 |
| JP | 6-166721 | 6/1994 |
| JP | 9-193407 | 7/1997 |
| JP | 2006-068904 | 3/2006 |
| JP | 2008-290292 | 12/2008 |
| JP | 2011-131533 A | 7/2011 |
| JP | 2012-011585 | 1/2012 |
| JP | 2013-040280 | 2/2013 |
| JP | 2014-162224 | 9/2014 |
| JP | 2015-071289 | 4/2015 |
| WO | WO2002/061001 A1 | 8/2002 |

OTHER PUBLICATIONS

Masahiro Takeyoshi, "Current Status and Novel Methodology for Detecting Skin Sensitization Potential of Chemicals" Kinou Zairyou (Functional Material), vol. 25, No. 9, 2005, p. 55-64. (with English Abstract).

Extended European Search Report dated Aug. 14, 2018 in European Patent Application No. 17203133.8, 13 pages.

Partial European Search Report dated Apr. 16, 2018 in European Patent Application No. 17203133.8, 14 pages.

Combined Chinese Office Action and Search Report dated Feb. 1, 2019 in corresponding Chinese Patent Application No. 201711247962.7 (with English Translation of Category of Cited Documents), 11 pages.

Office Action dated Sep. 23, 2019 to Chinese Patent Application No. 201711247962.7, filed Dec. 1, 2017, citing document AO therein.

* cited by examiner

INKJET RECORDING APPARATUS, PRINTER, AND METHOD FOR MANUFACTURING CURED PRODUCT

CROSS-REFERENCE TO RELATED APPLICATIONS

This patent application is based on and claims priority pursuant to 35 U.S.C. § 119(a) to Japanese Patent Application Nos. 2016-235282 and 2017-214818, filed on Dec. 2, 2016 and Nov. 7, 2017, respectively, in the Japan Patent Office, the entire disclosure of each of which is hereby incorporated by reference herein.

BACKGROUND

Technical Field

The present disclosure relates to an inkjet recording apparatus, a printer, and a method for manufacturing cured product.

Description of the Related Art

In conventional metal coating, polyvinyl chloride resins and polyester resins have been used as coating materials. Metals coated with such coating materials are used for various objects such as home electric appliances, office supplies, and food containers.

Polyvinyl chloride resins provide excellent retort resistance, content resistance, and processability. On the other hand, it has been pointed out that residual vinyl chloride monomers remaining in polyvinyl chloride resins raise serious hygiene problems such as carcinogenicity. When cans coated with the polyvinyl chloride resin are discarded by incineration treatment, highly corrosive gases such as chlorine gas and hydrogen chloride gas and/or extremely poisonous gases such as dioxin may generate. As a result, the incineration equipment may be corroded and environmental pollution may occur. In addition, polyvinyl chloride resins are poorly adhesive to metals that constitute the cans. In coating metals with the polyvinyl chloride resin, it is necessary that the metals be treated with an epoxy resin before being coated with polyvinyl chloride resin, which results in a complicated coating process. Polyester resins are more preferred than polyvinyl chloride resins because they have excellent adhesiveness to metals and do not generate toxic or corrosive gas even when incinerated.

SUMMARY

In accordance with some embodiments of the present invention, an inkjet recording apparatus is provided. The inkjet recording apparatus includes a curable ink and a discharge head. The curable ink comprises a polymer having a polyester structural unit. The discharge head includes an individual liquid chamber including a circulation channel in which the curable ink is circulatable, and a nozzle from which the curable ink is dischargeable.

In accordance with some embodiments of the present invention, a printer is provided. The printer includes an ink film forming device and a photo-curing device. The ink film forming device is configured to form an ink film, and includes the above inkjet recording apparatus. The photo-curing device is configured to cure the ink film with light.

In accordance with some embodiments of the present invention, a method for manufacturing cured product is provided. The method include the steps of circulating a curable ink comprising a polymer having a polyester structural unit within a circulation channel in an individual liquid chamber disposed in a discharge head; discharging the curable ink from a nozzle disposed in the discharge head to form an ink film; and curing the ink film.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
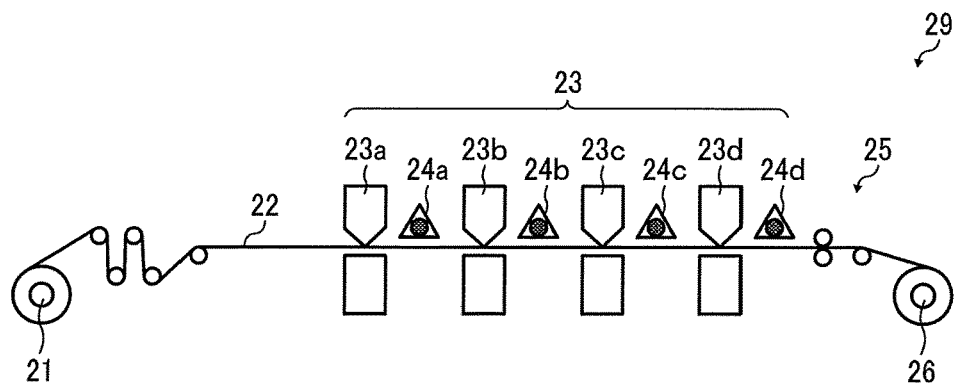
FIG. 1 is a schematic view of an image forming apparatus in accordance with some embodiments of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, an inkjet recording apparatus is provided that includes a discharge head capable of reliably discharging a curable ink having excellent adhesiveness to metals and less skin sensitizing property.

Inkjet Recording Apparatus

An inkjet recording apparatus in accordance with some embodiments of the present invention includes a curable ink and a discharge head. The curable ink comprises a polymer having a polyester structural unit. The discharge head includes an individual liquid chamber and a nozzle plate. The individual liquid chamber includes a circulation channel in which the curable ink is circulatable. The nozzle plate has a nozzle from which the curable ink is dischargeable.

Depending on the surrounding environment of the apparatus, there may be a case in which a polymerization reaction is accelerated by external light at a contact portion of the discharge head with external air in the vicinity of the nozzle. Generally, a nozzle plate of a discharge head for discharging solvents is made of a metal which will not be chemically attacked by a liquid to be discharged. The inkjet recording apparatus is achieved based on the finding that an ink comprising a photopolymerizable composition comprising polyester has strong adhesiveness to metals, and the adhesiveness to metals will not deteriorate even when the polymerization is accelerated by external light in the ink at the vicinity of the nozzle. As such an ink come to adhere to the nozzle plate, the nozzle may be covered with the ink and abnormal discharging or misfiring may be caused.

The inkjet recording apparatus is also achieved based on the finding that conventional liquid droplet discharge heads cannot solve the problem of abnormal discharge and misfiring of ink because they do not have a configuration such that the ink present inside or near the nozzle are circulated to be refreshed.

Preferably, the inkjet recording apparatus further includes a mechanism configured to perform a micro drive operation at a level that the curable ink is not discharged at a time when an image forming discharging operation is not performed.

Circulation is generally performed when the apparatus is not performing a discharging operation, but can also be performed when the apparatus is performing a discharging operation. It is possible that circulation is performed in both situations.

Ink

The curable ink comprises a polymer having a polyester structural unit. Preferably, the curable ink further comprises a white pigment. The curable ink may optionally comprise other components, as necessary.

Conventionally, there has not been found an ink negative in skin sensitizing property and exhibiting, when used alone, both sufficiently low viscosity and sufficient curability. In view of this situation, the inventors of the present invention have studied how to obtain such an ink by blending a monomer having a good curability but a high viscosity with another monomer having a low viscosity but an insufficient curability in a well-balanced manner, where both monomers are negative in skin sensitizing property.

As a result, vinyl ethers, and acrylates and methacrylates, such as t-butyl methacrylate, n-pentyl methacrylate, and n-hexyl methacrylate, have been found as polymerizable monomers negative in skin sensitizing property and having a sufficiently low viscosity. It has also been found that when these monomers are used in combination with at least one of acrylic acid ester, methacrylic acid ester, acrylamide, and methacrylamide, all of which have been known to be negative in skin sensitizing property, low viscosity and good curability can be achieved at the same time.

The polymerizable monomer negative in skin sensitizing property refers to a compound fallen into at least one of the following categories (1) to (3).

(1) Compounds having a stimulus index ("SI") of less than 3, where SI indicates the degree of sensitizing property measured by a skin sensitization test called Local Lymph Node Assay ("LLNA").

(2) Compounds evaluated as "being negative in skin sensitizing property" or "having no skin sensitizing property" in Material Safety Data Sheet ("MSDS").

(3) Compounds evaluated as "being negative in skin sensitizing property" or "having no skin sensitizing property" in a document, such as "Contact Dermatitis, 8, 223-235, 1982".

Regarding the category (1), it is described in "KINOU ZAIRYOU", Vol. 25, No. 9, 2005, p. 55 that a compound having an SI of less than 3 is determined to be negative in skin sensitizing property. As SI becomes lower, skin sensitizing property becomes lower. Therefore, monomers and oligomers having an SI as low as possible are preferably used in the present disclosure. Preferably, the SI is less than 3, more preferably 2 or less, and most preferably 1.6 or less. It is to be noted that an ink containing the polymerizable monomer negative in skin sensitizing property is also negative in skin sensitizing property.

Examples of the acrylates and methacrylates include, but are not limited to, monofunctional acrylates and methacrylates and polyfunctional acrylates and methacrylates.

Monofunctional Acrylates and Methacrylates

The monofunctional acrylate refers to a compound having one acryloyl group per molecule. The monofunctional methacrylate refers to a compound having one methacryloyl group per molecule.

For safety, it is preferable that the monofunctional acrylates and methacrylates are negative in skin sensitizing property. However, even when they are positive in skin sensitizing property, the worker's safety can be secured as the worker put on an appropriate protective gear.

Here, monofunctional acrylates and methacrylates being negative in skin sensitizing property refer to those having an SI of less than 3.

Specific examples of the monofunctional acrylates and methacrylates negative in skin sensitizing property include, but are not limited to, t-butyl methacrylate, n-pentyl methacrylate, and n-hexyl methacrylate. Each of these monomers can be used alone or in combination with others.

Preferably, the content of the monofunctional acrylate and/or methacrylate in 100 parts by mass of monomer components is in the range of from 50 to 85 parts by mass.

Polyfunctional Acrylates or Methacrylates

The polyfunctional acrylate refers to a compound having two or more (preferably 2 to 4) acryloyl groups per molecule. The polyfunctional methacrylate refers to a compound having two or more (preferably 2 to 4) methacryloyl groups per molecule.

For safety, it is preferable that the polyfunctional acrylates and methacrylates are negative in skin sensitizing property. However, even when they are positive in skin sensitizing property, the worker's safety can be secured as the worker put on an appropriate protective gear.

Here, polyfunctional acrylates and methacrylates being negative in skin sensitizing property refer to those having an SI of less than 3.

Specific examples of the polyfunctional acrylates and methacrylates negative in skin sensitizing property include, but are not limited to, glycerol dimethacrylate, tricyclodecane dimethanol dimethacrylate, ethylene-oxide-modified trimethylolpropane triacrylate and trimethacrylate, and caprolactone-modified dipentaerythritol hexaacrylate. Each of these monomers can be used alone or in combination with others.

Preferably, the content of the polyfunctional acrylate and/or methacrylate in 100 parts by mass of monomer components is in the range of from 15 to 50 parts by mass.

It is to be noted that t-butyl methacrylate, n-pentyl methacrylate, and n-hexyl methacrylate, exemplified above as the monofunctional acrylates and methacrylates, each have a low viscosity ranging from 1 to 2 mPa·s at 25° C. These monomers may contribute to lowering of the ink viscosity so that the ink can be discharged by inkjet, without causing a problem of skin sensitization. However, in some cases, the monofunctional acrylate or methacrylate alone cannot give sufficient curability to the ink. In such cases, high curability can be given to the ink when the monofunctional acrylate or methacrylate is used in combination with at least one polyfunctional acrylate or methacrylate selected from glycerol dimethacrylate, tricyclodecane dimethanol dimethacrylate, ethylene-oxide-modified trimethylolpropane trimethacrylate, and caprolactone-modified dipentaerythritol hexaacrylate.

When the monofunctional acrylate and/or methacrylate is denoted as compound (A), the polyfunctional acrylate and/or methacrylate is denoted as compound (B), 1-hydroxycyclohexyl phenyl ketone, 2-dimethylamino-2-(4-methylbenzyl)-1-(4-morpholine-4-yl-phenyl)butane-1-one, and/or an equimolar mixture of 2,4-diethylthioxanthone and 2-ethylhexyl p-dimethylaminobenzoate is denoted as compound (C), each of which being a readily-available cheap polymerization initiator negative in skin sensitizing property, and the polymer having a polyester structural unit is denoted as component (D), preferably, the content of the compound (A) is 50 to 85 parts by mass, the content of the compound of (B) is 15 to 50 parts by mass, and the content of the compound (C) is 5 to 15 parts by mass, in 100 parts by mass of the monomer components. In addition, the content of the compound (D), which is a polymer having a higher molecular weight than monomers, is preferably 5 to 20 parts by mass, more preferably 5 to 15 parts by mass, for improving dischargeability.

Compounds having a slight problem in skin sensitizing property when used alone or those having unknown skin sensitizing property can also be used as the polymerizable monomer, as necessary.

Examples of such compounds include, but are not limited to, acrylates and methacrylates, acrylamides and methacrylamides, vinyl ethers, and combinations thereof. Specific examples thereof include, but are not limited to, ethylene glycol diacrylate and dimethacrylate, hydroxypivalic acid neopentyl glycol diacrylate and dimethacrylate, γ-butyrolactone acrylate, isobornyl acrylate and methacrylate, formalized trimethylolpropane monoacrylate and monomethacrylate, polytetramethylene glycol diacrylate and dimethacrylate, trimethylolpropane acrylic acid benzoic acid ester, trimethylolpropane methacrylic acid benzoic acid ester, diethylene glycol diacrylate, triethylene glycol diacrylate, tetraethylene glycol diacrylate, polyethylene glycol diacrylate ($CH_2$=$CH$—$CO$—$(OC_2H_4)_n$—$OCOCH$=$CH_2$ ($n \cong 9$, $n \cong 14$, or $n \cong 23$)), dipropylene glycol diacrylate and dimethacrylate, tripropylene glycol diacrylate and dimethacrylate, polypropylene glycol dimethacrylate ($CH_2$=$C(CH_3)$—$CO$—$(OC_3H_6)_n$—$OCOC(CH_3)$=$CH_2$ ($n \cong 7$)), 1,3-butanediol diacrylate, 1,4-butanediol diacrylate and dimethacrylate, 1,6-hexanediol diacrylate and dimethacrylate, 1,9-nonanediol diacrylate and dimethacrylate, neopentyl glycol diacrylate and dimethacrylate, tricyclodecane dimethanol diacrylate, propylene-oxide-modified bisphenol A diacrylate and dimethacrylate, polyethylene glycol diacrylate and dimethacrylate, dipentaerythritol hexaacrylate and hexamethacrylate, acryloyl morpholine, methacryloyl morpholine, 2-hydroxypropyl acrylamide and methacrylamide, propylene-oxide-modified tetramethylolmethane tetraacrylate and tetramethacrylate, dipentaerythritol hydroxypentaacrylate and hydroxypentamethacrylate, caprolactone-modified dipentaerythritol hydroxypentaacrylate and hydroxypentamethacrylate, ditrimethylolpropane tetraacrylate and tetramethacrylate, pentaerythritol tetraacrylate and tetramethacrylate, trimethylolpropane triacrylate, ethylene-oxide-modified trimethylolpropane triacrylate, propylene-oxide-modified trimethylolpropane triacrylate and trimethacrylate, caprolactone-modified trimethylolpropane triacrylate and trimethacrylate, pentaerythritol triacrylate and trimethacrylate, tris(2-hydroxyethyl)isocyanurate triacrylate and trimethacrylate, ethoxylated neopentyl glycol diacrylate and dimethacrylate, propylene-oxide-modified neopentyl glycol diacrylate and dimethacrylate, propylene-oxide-modified glyceryl triacrylate and trimethacrylate, polyester diacrylate and dimethacrylate, polyester triacrylate and trimethacrylate, polyester tetraacrylate and tetramethacrylate, polyester pentaacrylate and pentamethacrylate, polyester polyacrylate and polymethacrylate, N-vinyl caprolactam, N-vinyl pyrrolidone, N-vinyl formamide, polyurethane diacrylate and dimethacrylate, polyurethane triacrylate and trimethacrylate, polyurethane tetraacrylate and tetramethacrylate, polyurethane pentaacrylate and pentamethacrylate, polyurethane polyacrylate and polymethacrylate, triethylene glycol divinyl ether, cyclohexanedimethanol divinyl ether, cyclohexanedimethanol monovinyl ether, hydroxyethyl vinyl ether, diethylene glycol monovinyl ether, diethylene glycol divinyl ether, dicyclopentadiene vinyl ether, tricyclodecane vinyl ether, benzyl vinyl ether, ethyl-oxetane methyl vinyl ether, triethylene glycol divinyl ether, hydroxybutyl vinyl ether, and ethyl vinyl ether. Each of these compounds can be used alone or in combination with others.

Polymer Having Polyester Structural Unit Specific examples of the polymer having a polyester structural unit include, but are not limited to, commercially-available products such as VYLON® 802 (product of Toyobo Co., Ltd., having a number average molecular weight of 3,000, a hydroxyl value of 37 mgKOH/g, and an acid value less than 1 mgKOH/g) and VYLON® GK810 (product of Toyobo Co., Ltd., having a number average molecular weight of 6,000, a hydroxyl value of 19 mgKOH/g, and an acid value of 5 mgKOH/g).

Curing Means

The curable ink in accordance with some embodiments of the present invention comprises a curable composition. Preferably, the curable composition is cured by application of heat or irradiation with an active energy ray, and the latter is more preferable. Specific examples of the active energy ray for curing the curable composition include, but are not limited to, ultraviolet ray, electron beam, $\alpha$-ray, $\beta$-ray, $\gamma$-ray, and X-ray, each of which is capable of giving energy to polymerizable components included in the composition to cause a polymerization reaction. In a case in which a high-energy light source is used, the polymerization reaction can proceed without using a polymerization initiator. In the case of ultraviolet ray emission, mercury-free light sources are strongly demanded in accordance with the increasing momentum of environment preservation. In particular, a GaN-based semiconductor ultraviolet light emitting device is preferably used as the light source from both industrial and environmental aspects. In addition, ultraviolet light emitting diode (UV-LED) and ultraviolet light laser diode (UV-LD) are preferable since they are advantageous in terms of their compact size, extended lifespan, high efficiency, and low cost.

Polymerization Initiator

The curable composition may contain a polymerization initiator. The polymerization initiator is a material capable of generating active species, such as radical and cation, by the action of active energy rays, to cause polymerizable compounds (e.g., monomer and oligomer) to initiate a polymerization. Examples of the polymerization initiator include radical polymerization initiators, cationic polymerization initiators, base generators, and combinations thereof. In particular, radical polymerization initiators are preferable. In order to secure a sufficient curing speed, the content rate of the polymerization initiator in 100% by mass of the composition is preferably in the range of from 5% to 20% by mass.

Specific examples of the radical polymerization initiators include, but are not limited to, aromatic ketones, acylphosphine oxide compounds, aromatic onium salt compounds, organic peroxides, thio compounds (e.g., thioxanthone compounds and thiophenyl-group-containing compounds), hexaaryl biimidazole compounds, ketoxime ester compounds, borate compounds, azinium compounds, metallocene compounds, active ester compounds, carbon-halogen-bond-containing compounds, and alkylamine compounds.

In addition, a polymerization accelerator (or sensitizer) may be used in combination with the polymerization initiator. Specific examples of the polymerization accelerator include, but are not limited to, amine compounds, such as trimethylamine, methyldimethanolamine, triethanolamine, p-diethylaminoacetophenone, ethyl p-dimethylaminobenzoate, 2-ethylhexyl p-dimethylaminobenzoate, N,N-dimethylbenzylamine, and 4,4'-bis(diethylamino)benzophenone. The content of the polymerization accelerator is determined according to the type and amount of the polymerization initiator used in combination.

Colorant

The curable composition may contain a colorant. Examples of the colorant include pigments and dyes having a color such as black, white, magenta, cyan, yellow, green, and orange, or a metallic color such as gold and silver. The type of colorant is selected according to the use purpose and demand characteristics of the composition. The content rate of the colorant can be appropriately determined depending on a desired color density and dispersibility of the colorant in the composition. Preferably, the content rate of the colorant in 100% by mass of the composition is in the range of from 0.1% to 20% by mass. Alternatively, the curable composition may contain no colorant to be colorless and transparent. In this case, the curable composition is preferably used for an overcoat layer for protecting an image.

Examples of the pigments include inorganic pigments and organic pigments. Two or more of these pigments can be used in combination.

Specific examples of the inorganic pigments include, but are not limited to, carbon blacks (i.e., C.I. Pigment Black 7) such as furnace black, lamp black, acetylene black, and channel black; iron oxides; and titanium oxides.

Specific examples of the organic pigments include, but are not limited to, azo pigments (e.g., insoluble azo pigments, condensed azo pigments, azo lakes, and chelate azo pigments), polycyclic pigments (e.g., phthalocyanine pigments, perylene and perinone pigments, anthraquinone pigments, quinacridone pigments, dioxane pigments, thioindigo pigments, isoindolinone pigments, and quinophthalone pigments), dye chelates (e.g., basic dye chelates and acid dye chelates), dye lakes (e.g., basic dye lakes and acid dye lakes), nitro pigments, nitroso pigments, aniline black, and daylight fluorescent pigments.

The curable composition may further contain a dispersant for improving dispersibility of the colorant.

Examples of the dispersant include, but are not limited to, polymeric dispersants commonly used for preparing pigment dispersions.

Examples of the dyes include, but are not limited to, acid dyes, direct dyes, reactive dyes, and basic dyes. Two or more of these dyes can be used in combination.

Among the above colorants, white pigments are preferable for improving hiding power (or opacity).

Specific examples of the white pigments include, but are not limited to, titanium oxide, silica, and zinc oxide. Each of these pigments can be used alone or in combination with others. Among these pigments, titanium oxide and zinc oxide are preferable.

Organic Solvent

The curable composition may contain an organic solvent. However, it is more preferable that the curable composition contain no organic solvent. When the curable composition is a VOC (volatile organic compound) free compound containing no organic solvent, a higher degree of safety is provided at sites where the composition is handled and environment pollution is prevented. Here, the organic solvent refers to a typical non-reactive organic solvent, such as ether, ketone, xylene, ethyl acetate, cyclohexanone, and toluene.

The organic solvent is discriminated from a reactive monomer. When the composition is stated to contain no organic solvent, it means that the composition "substantially" contain no organic solvent. In this case, the content rate of the organic solvent in the composition is preferably less than 0.1% by mass.

Other Components

The curable composition may optionally contain other components, as necessary. Examples of the other components include, but are not limited to, a surfactant, a polymerization inhibitor, a leveling agent, a defoamer, a fluorescence brightening agent, a permeation accelerator, a wetting agent (humectant), a fixing agent, a viscosity stabilizer, a fungicide, a preservative, an antioxidant, an ultraviolet absorber, a chelate agent, a pH adjuster, and a thickener.

Preparation of Curable Composition

The curable composition may be prepared by: dispersing the polymerizable monomer, the pigment, the dispersant, etc., by a disperser (e.g., ball mill, KITI mill, disc mill, pin mill, DYNO-MILL) to prepare a pigment dispersion liquid; and further mixing the polymerizable monomer, the polymerization initiator, the polymerization inhibitor, a surfactant, etc., in the pigment dispersion liquid. However, the preparation method is not limited thereto.

Viscosity

The viscosity of the curable composition is adjusted in accordance with the purpose of use or application. When the curable composition is applied to a discharge device that discharges the composition from nozzles, the viscosity of the composition is preferably adjusted to from 3 to 40 mPa·s, more preferably from 5 to 15 mPa·s, and most preferably from 6 to 12 mPa·s, at a temperature of from 20° C. to 65° C., more preferably at 25° C. Preferably, the curable composition exhibits a viscosity within the above-described range without containing any organic solvent. The viscosity can be measured with a cone-plate rotary viscometer (VISCOMETER TVE-22L available from Toki Sangyo Co., Ltd.) using a cone rotor (1°34'×R24) while setting the revolution to 50 rpm and the temperature of the constant-temperature circulating water to from 20° C. to 65° C. The temperature of the circulating water can be adjusted by an instrument VISCOMATE VM-150III.

Preferably, the curable ink exhibits a viscosity of from 2 to 150 mPa·s, more preferably from 3 to 40 mPa·s, at 25° C.

Use Application

The curable composition can be applied to, for example, modeling resins, paints, adhesives, insulating materials, release agents, coating materials, sealing materials, resists, and optical materials.

Figure 2:
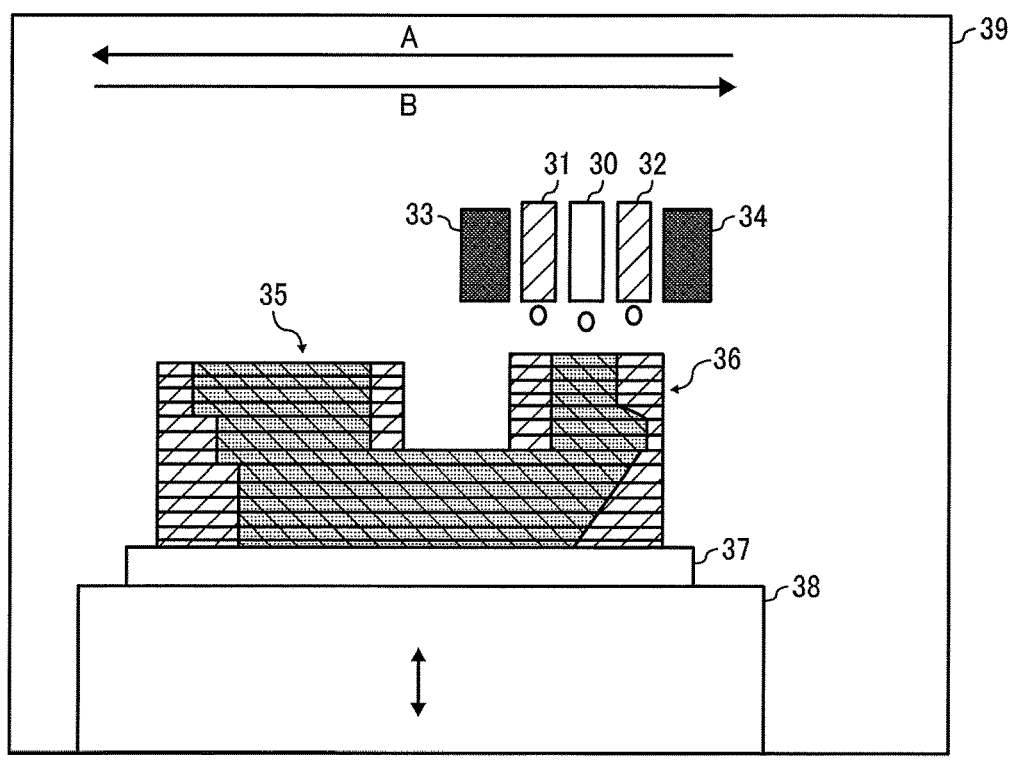
FIG. 2 is a schematic view of an image forming apparatus in accordance with some embodiments of the present invention.
Figure 3A:
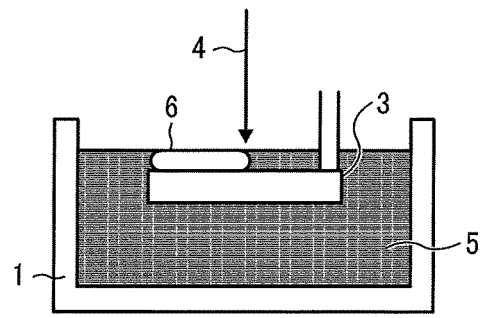
FIGS. 3A to 3D are schematic views of an image forming apparatus in accordance with some embodiments of the present invention.
Figure 3B:
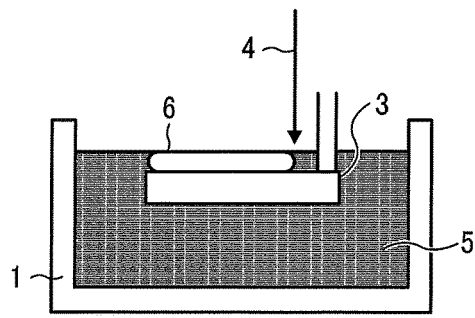
Figure 3C:
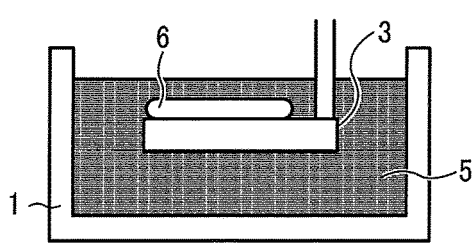
Figure 3D:
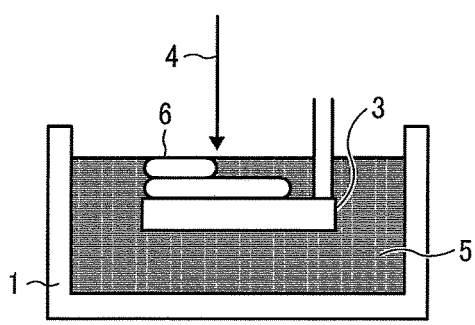

For example, the curable composition can be applied to inks for forming two-dimensional texts and images, and design coatings on various substrates, as illustrated in FIG. 1 (details are described later). As another example, the curable composition can be applied to materials for forming three-dimensional images (i.e., three-dimensional objects). The materials for forming three-dimensional objects can be used as a binder for binding powder particles in additive manufacturing that forms a three-dimensional object by repeatedly hardening and laminating powder layers. The materials for forming three-dimensional objects can also be used as a model material and a support material for use in stereolithography (one specific example of additive manufacturing) as illustrated in FIG. 2 and FIGS. 3A to 3D. FIG. 2 is an illustration of a method in which the curable composition is discharged to a certain region and exposed to an active energy ray to cure, and the cured layers are sequentially laminated to form a three-dimensional object. Details of this method are described later. FIGS. 3A to 3D are illustrations of another method in which an active energy ray curable composition 5 is retained in a pool 1 and exposed to an active energy ray 4 to be formed into a cured layer 6 on a movable stage 3, and the cured layers 6 are sequentially laminated to form a three-dimensional object.

The curable composition can be used for three-dimensional object forming apparatuses that may include a storage for storing the composition, a supplier, a discharger, and an active energy ray emitter.

The curable composition may be cured to become a cured product. The cured product may be formed on a substrate to form a structural body with the substrate. The structural body may be processed into a processed product. The processed product may be produced by subjecting a sheet-like or film-like cured product or structural body to a molding processing such as heat stretching processing and punching processing. The processed product is preferably used for meters and operation panels of automobiles, office automation equipments, electric or electronic devices, and cameras, which typically need to be surface-decorated.

Specific examples of the substrate include, but are not limited to, paper, thread, fiber, fabric, leather, metal, plastic, glass, wood, ceramics, and composite materials thereof. Among these materials, plastic substrates are preferable from the aspect of processability.

Composition Storage Container

The composition storage container refers to a container in which the curable composition is stored, and is preferably used for the above-described purposes. When the curable composition is used as an ink, the container storing the ink serves as an ink cartridge or ink bottle that prevents the user from directly contacting the ink when the user is transporting or replacing the ink, thus preventing user's fingers and clothes from being contaminated with the ink. In addition, the ink cartridge or ink bottle prevents foreign substances from being mixed into the ink. The container is not limited in shape, size, and material. Preferably, the container is made of a light-blocking material that transmits no light, or the container is covered with a light-blocking sheet.

Figure 4:
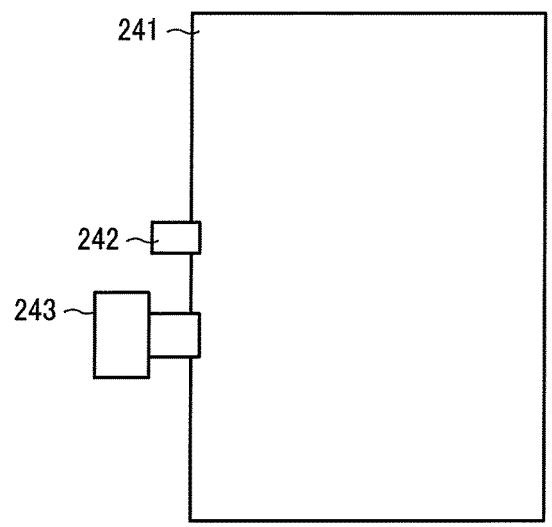
FIG. 4 is a schematic view of a composition storage container in accordance with some embodiments of the present invention.
Figure 5:
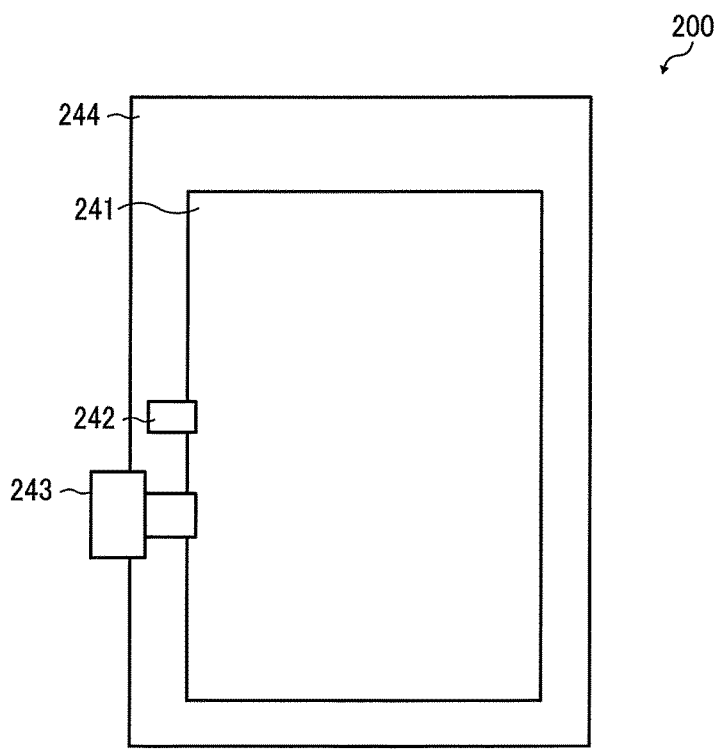
FIG. 5 is a schematic view of the composition storage container illustrated in FIG. 4 along with a casing (exterior package) thereof.

Details of the composition storage container are described below with reference to FIGS. 4 and 5. FIG. 4 is a schematic view of the composition storage container in accordance with some embodiments of the present invention. FIG. 5 is another schematic view of the composition storage container illustrated in FIG. 4 along with a casing (exterior package) thereof.

Referring to FIG. 4, an ink bag 241 is filled with the ink through an ink inlet 242. After the air remaining in the ink bag 241 is discharged, the ink inlet 242 is sealed by fusion. When the ink bag 241 is in use, an ink outlet 243, made of a rubber material, is pricked with a needle of an apparatus body, so that the ink can be supplied to the apparatus body.

The ink bag 241 is formed of a wrapping material having no air permeability, such as an aluminum laminate film. Referring to FIG. 5, the ink bag 241 is stored in a cartridge casing 244 made of a plastic material, thus providing an ink cartridge 200. The ink cartridge 200 can be detachably mountable on inkjet recording apparatuses.

The composition storage container can be detachably mountable on various inkjet recording apparatuses, preferably on the inkjet recording apparatus in accordance with some embodiments of the present invention.

Discharge Head

The discharge head includes an individual liquid chamber including a circulation channel in which the curable ink is circulatable, and a nozzle from which the curable ink is dischargeable. Preferably, the discharge head further includes a temperature sensor. The discharge head may further optionally include other devices, as necessary.

Figure 6:
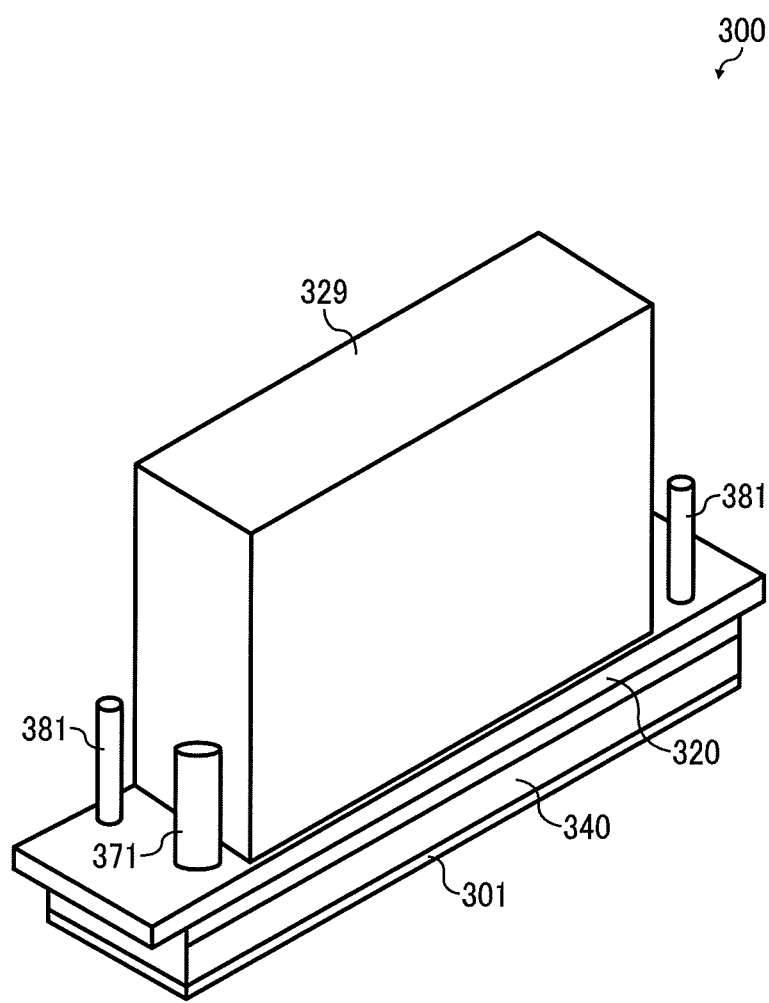
FIG. 6 is a perspective view of an outline of a discharge head of an inkjet recording apparatus in accordance with some embodiments of the present invention.
Figure 7:
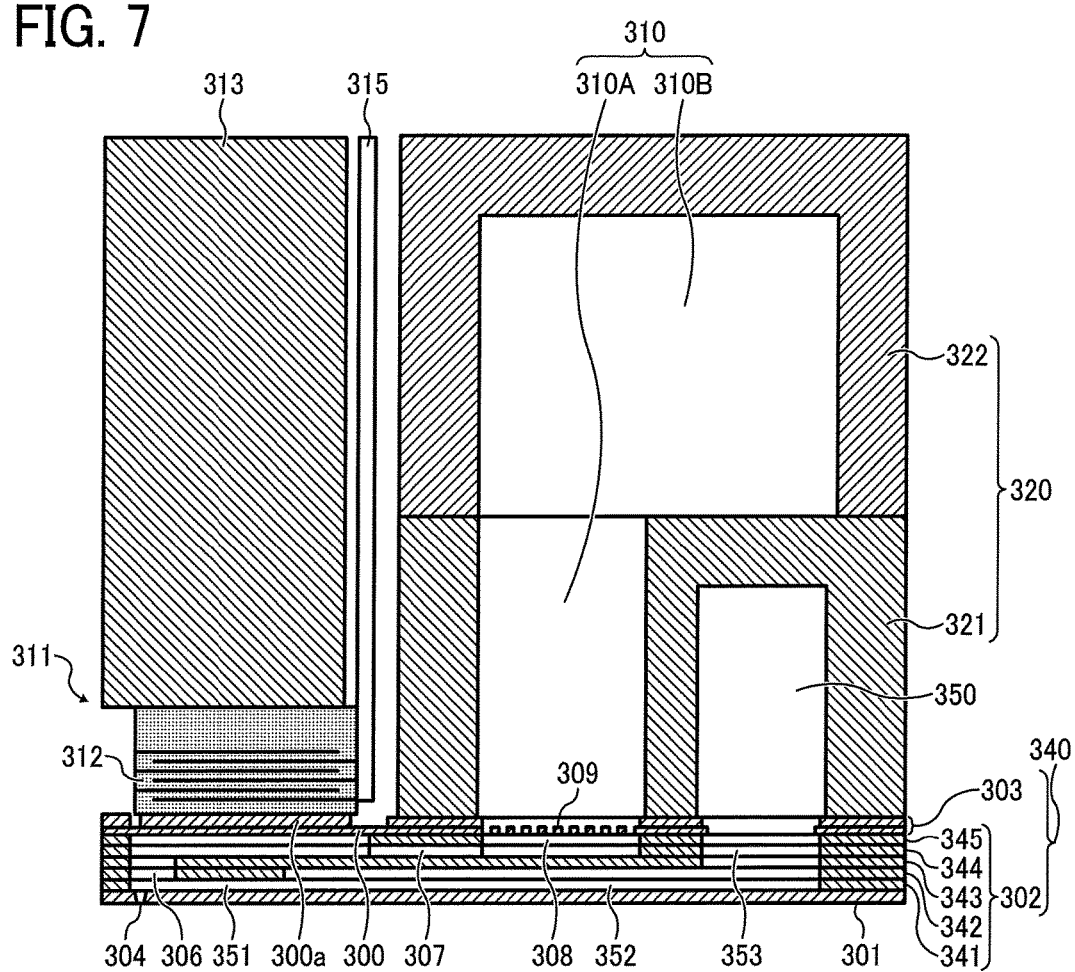
FIG. 7 is a cross-sectional view of the discharge head illustrated in FIG. 6 in a direction perpendicular to the nozzle array direction.
Figure 8:
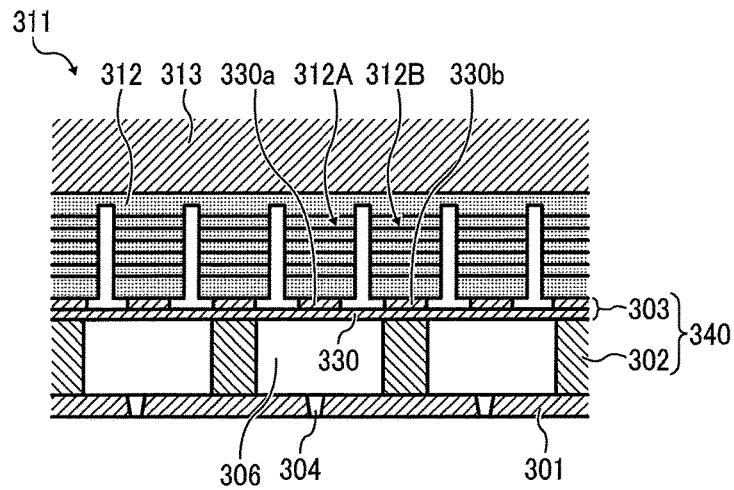
FIG. 8 is a cross-sectional view of the discharge head illustrated in FIG. 6 in a direction parallel to the nozzle array direction.
Figure 9:
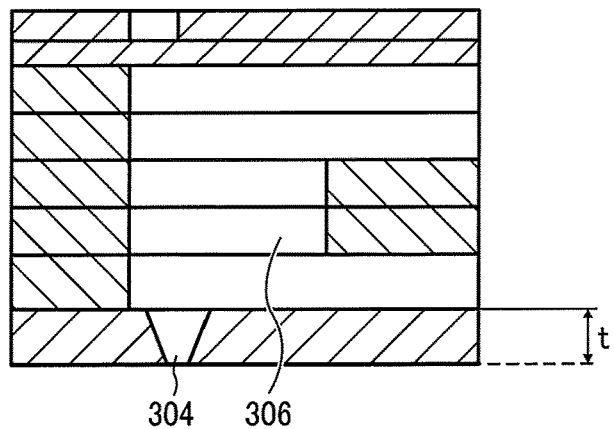
FIG. 9 is a magnified view of FIG. 7 indicating the thickness t of a nozzle plate of the discharge head illustrated in FIG. 6.

Details of a discharge head 300 in accordance with some embodiments of the present invention are described in detail below with reference to FIGS. 6 to 12. FIG. 6 is a perspective view of an outline of a discharge head of an inkjet recording apparatus (or ink discharge device) in accordance with some embodiments of the present invention. FIG. 7 is a cross-sectional view of the discharge head illustrated in FIG. 6 in a direction perpendicular to the nozzle array direction. FIG. 8 is a cross-sectional view of the discharge head illustrated in FIG. 6 in a direction parallel to the nozzle array direction. FIG. 9 is a magnified view of FIG. 7 indicating the thickness t of a nozzle plate.

Figure 10:
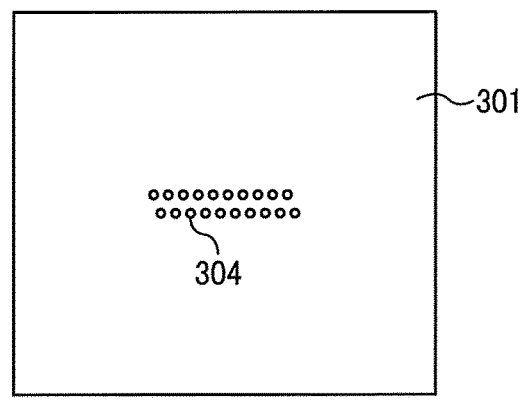
FIG. 10 is a plan view of the nozzle plate of the discharge head illustrated in FIG. 6.

FIG. 10 is a plan view of a nozzle plate of the discharge head illustrated in FIG. 6. FIGS. 11A to 11F are plan views of members constituting a channel substrate of the discharge head illustrated in FIG. 6. FIGS. 12A and 12B are plan views of members constituting a common liquid chamber substrate of the discharge head illustrated in FIG. 6.

In the discharge head 300, a nozzle plate 301, a channel plate 302, and a diaphragm 303 as a wall member are attached to and laminated on each other. The discharge head further includes a piezoelectric actuator 311 that displaces the diaphragm 303, a common liquid chamber substrate 320, and a cover 329.

The nozzle plate 301 includes multiple nozzles 304 that discharge the ink.

The channel plate 302 forms an individual liquid chamber 306 communicated with the nozzle 304, a fluid resistance part 307 communicated with the individual liquid chamber 306 serving as a flow-in channel, and a liquid introduction part 308 communicated with the fluid resistance part 307. The channel plate 302 is formed of multiple plate-like members 341 to 345 attached to each other in a lamination manner on the nozzle plate 301. The plate-like members 341 to 445 and the diaphragm 303 are attached to and laminated on each other to form a channel substrate 340. The nozzle plate 301 and the channel substrate 340 are preferably made of a metal such as stainless steel that is resistant to chemical attack by solvents.

The diaphragm 303 includes a filter part 309 serving as an opening for communicating the liquid introduction part 308 with a common liquid chamber 310 formed of the common liquid chamber substrate 320.

The diaphragm 303 is a wall member forming the wall of the individual liquid chamber 306 of the channel plate 302. This diaphragm 303 employs a two-layered structure (but not limited thereto) including, from the channel plate 302 side, the first layer forming a thin portion and the second layer forming a thick portion. A vibration area 330 that is deformable is formed at the portion of the first layer corresponding to the individual liquid chamber 306.

The nozzle plate 301 includes multiple nozzles 304 arranged in a zigzag manner, as illustrated in FIG. 10.

Figure 11A:
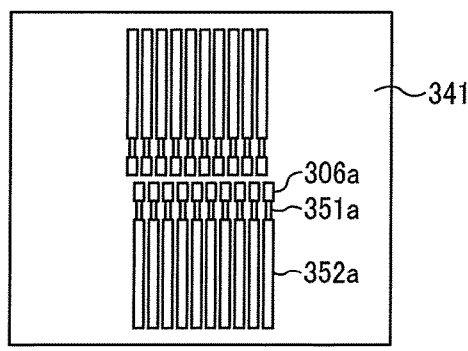
FIGS. 11A to 11F are plan views of members constituting a channel substrate of the discharge head illustrated in FIG. 6.
Figure 12A:
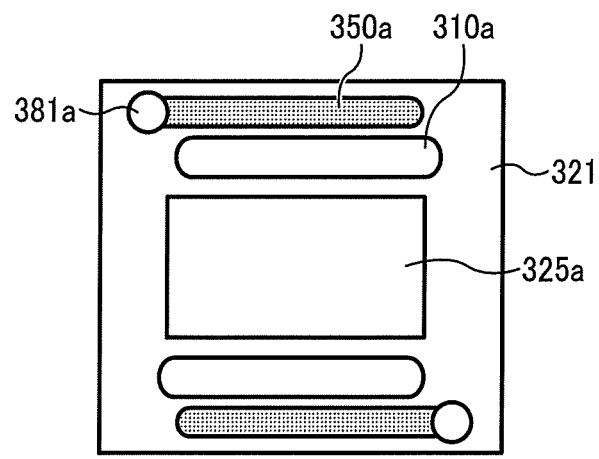
FIGS. 12A and 12B are plan views of members constituting a common liquid chamber substrate of the discharge head illustrated in FIG. 6.
Figure 12B:
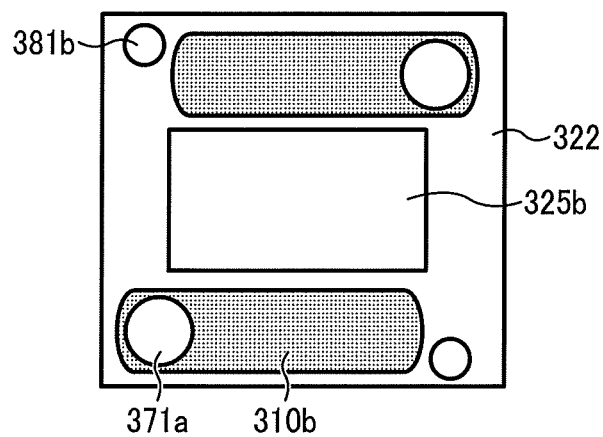

As illustrated in FIG. 11A, the plate-like member 341 constituting the channel plate 302 includes through grooves (meaning through holes having a groove form) 306*a* each constituting the individual liquid chamber 306, through grooves 351*a* each constituting a fluid resistance part 351, and through grooves 352*a* each constituting a circulation channel 352 serving as a flow-out channel.

Figure 11B:
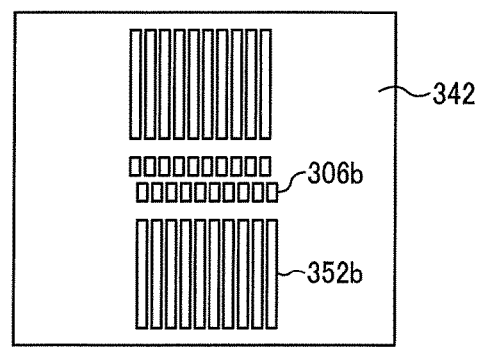

As illustrated in FIG. 11B, the plate-like member 342 includes through grooves 306*b* each constituting the individual liquid chamber 306 and through grooves 352*b* each constituting the circulation channel 352.

Figure 11C:
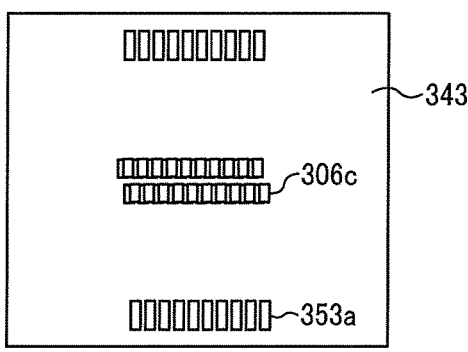

As illustrated in FIG. 11C, the plate-like member 343 includes through grooves 306*c* each constituting the individual liquid chamber 306 and through grooves 353*a* each constituting a circulation channel 353. The longitudinal direction of the through grooves 353*a* is coincident with the nozzle array direction.

Figure 11D:
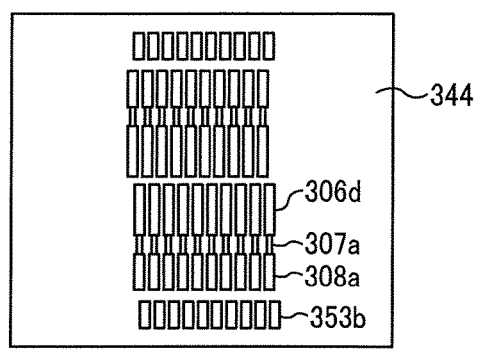

As illustrated in FIG. 11D, the plate-like member 344 includes through grooves 306*d* each constituting the individual liquid chamber 306, through grooves 307*a* each constituting the fluid resistance part 307, through grooves 308*a* each constituting the liquid introduction part 308, and through grooves 353*b* each constituting the circulation channel 353. The longitudinal direction of the through grooves 353*b* is coincident with the nozzle array direction.

Figure 11E:
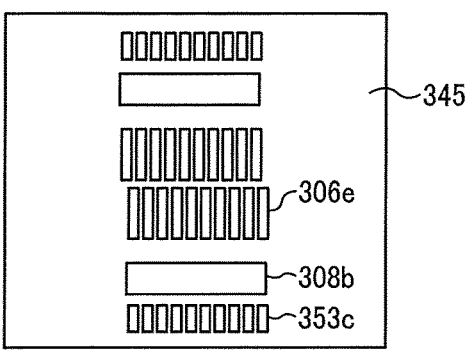

As illustrated in FIG. 11E, the plate-like member 345 includes through grooves 306*e* each constituting the individual liquid chamber 306, a through groove 308*b* (serving as a liquid chamber disposed downstream of the filter) constituting the liquid introduction part 308, and through grooves 353*c* each constituting the circulation channel 353. The longitudinal direction of both the through groove 308*b* and the through grooves 353*c* is coincident with the nozzle array direction.

Figure 11F:
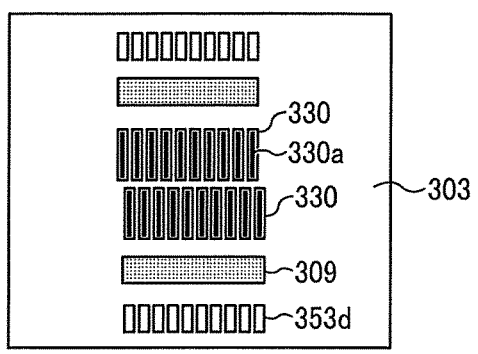

As illustrated in FIG. 11F, the diaphragm 303 includes the vibration areas 330, the filter part 309, and through grooves 353*d* each constituting the circulation channel 353. The longitudinal direction of the through grooves 353*d* is coincident with the nozzle array direction.

As a consequence, a complicated channel can be formed by a simple configuration in which multiple plate-like members are attached to each other in a lamination manner.

According to the configuration described above, in the channel substrate 340 formed of the channel plate 302 and the diaphragm 303, the fluid resistance part 351, the circulation channel 352, and the circulation channel 353 are formed. Specifically, the fluid resistance part 351 is formed along the plane direction of the channel plate 302 communicated with the individual liquid chamber 306. The circulation channel 353 is formed in the thickness direction of the channel substrate 340 communicated with the circulation channel 352. The circulation channel 353 is communicated with a circulation common liquid chamber 350 to be described later.

The common liquid chamber substrate 320 forms the common liquid chamber 310, to which the ink is supplied from the main tank or the composition storage container (ink cartridge), and the circulation common liquid chamber 350.

The common liquid chamber substrate 320 includes a first common liquid chamber substrate 321 and a second common liquid chamber substrate 322. As illustrated in FIG. 12A, the first common liquid chamber substrate 321 includes a through hole 325*a* for the piezoelectric actuator 311, a through groove 310*a* serving as a downstream common liquid chamber 310A disposed on the downstream side, and a groove 350*a* (having the bottom) serving as the circulation common liquid chamber 350.

As illustrated in FIG. 12B, the second common liquid chamber substrate 322 includes a through hole 325*b* for the piezoelectric actuator 311 and a groove 310*b* serving as an upstream common liquid chamber 310B disposed on the upstream side. The second common liquid chamber substrate 322 further includes a through hole 371*a* to communicate one end of the common liquid chamber 310 in the nozzle array direction with a supply port 371 illustrated in FIG. 6.

Similarly, the first common liquid chamber substrate 321 and the second common liquid chamber substrate 322 include a through hole 381a and a through hole 381b, respectively, to communicate the other end (the opposite end on the side of the through hole 371a) of the circulation common liquid chamber 350 in the nozzle array direction with a circulation port 381.

In FIGS. 12A and 12B, the grooves having the bottom are hatched. (The same applies to other drawings.)

The common liquid chamber substrate 320 includes the first common liquid chamber substrate 321 and the second common liquid chamber substrate 322, as described above. The first common liquid chamber substrate 321 is attached to the channel substrate 340 on the diaphragm 303 side and the second common liquid chamber substrate 322 is attached to and laminated on the first common liquid chamber substrate 321.

The first common liquid chamber substrate 321 forms the downstream common liquid chamber 310A, constituting a part of the common liquid chamber 310 communicated with the liquid introduction part 308, and the circulation common liquid chamber 350 communicated with the circulation channel 353. The second common liquid chamber substrate 322 forms the upstream common liquid chamber 310B constituting the rest of the common liquid chamber 310. In the upstream common liquid chamber 310B, a heater may be provided for heating the ink to a predetermined temperature. In the downstream common liquid chamber 310A, a temperature sensor may be provided so that, based on the temperature detected by the temperature sensor, the heater can be controlled so as to heat the ink to a predetermined temperature.

The downstream common liquid chamber 310A constituting a part of the common liquid chamber 310 and the circulation common liquid chamber 350 are disposed next to each other in a direction perpendicular to the nozzle array direction. The circulation common liquid chamber 350 is disposed at the position projected in the common liquid chamber 310.

By this disposition, the dimension (size) of the circulation common liquid chamber 350 is free of the restriction ascribable to the dimensions required for the individual liquid chamber 306, the fluid resistance part 307, and the liquid introduction part 308 formed in the channel substrate 340.

Since the circulation common liquid chamber 350 and a part of the common liquid chamber 310 are disposed side by side and the circulation common liquid chamber 350 is located at the position projected in the common liquid chamber 310, the width of the head in a direction perpendicular to the nozzle array direction is restricted, thereby preventing size increase of the head. The common liquid chamber substrate 320 forms the common liquid chamber 310, to which the ink is supplied from a head tank or the composition storage container, and the circulation common liquid chamber 350.

On the other side of the diaphragm 303 opposite to the individual liquid chamber 306, the piezoelectric actuator 311 is disposed. The piezoelectric actuator 311 includes an electromechanical transducer element serving as a driver (e.g., an actuator and a pressure generator) that deforms the vibration area 330 of the diaphragm 303.

As illustrated in FIG. 8, this piezoelectric actuator 311 includes a piezoelectric member 312 attached to a base material 313. The piezoelectric member 312 is grooved by half cut dicing and a particular number of piezoelectric elements (piezoelectric pillars) 312A and 312B each having a pillar-like shape are formed therein in a pectinate manner spaced a predetermined distance therebetween.

In the present embodiment, the piezoelectric element 312A is driven by application of a drive waveform while the piezoelectric element 312B is not driven but simply used as a pillar. Alternatively, all of the piezoelectric elements 312A and 312B can be used as the piezoelectric element to be driven by application of drive waveforms.

The piezoelectric element 312A is attached to a convex portion 330a that is a thick portion having an island-like form formed on the vibration area 330 of the diaphragm 303. The piezoelectric element 312B is attached to a convex portion 330b that is a thick portion of the diaphragm 303.

The piezoelectric member 312 includes piezoelectric layers and internal electrodes alternately laminated on each other. Each internal electrode is pulled out to the end surface to form an external electrode. The external electrode is connected with a flexible wiring member 315.

In the discharge head having such a configuration, the piezoelectric element 312A is contracted by lowering the voltage applied to the piezoelectric element 312A in comparison with a reference voltage. As a result, the vibration area 330 of the diaphragm 303 is lowered and the individual liquid chamber 306 is inflated, thereby letting the ink flow into the individual liquid chamber 306.

The piezoelectric element 312A is thereafter expanded in the lamination direction by raising the voltage applied to the piezoelectric element 312A. Thus, the vibration area 330 of the diaphragm 303 is deformed toward the nozzle 304 and the individual liquid chamber 306 is contracted. As a result, the ink in the individual liquid chamber 306 is pressurized and discharged from the nozzle 304.

The ink is then drawn into the individual liquid chamber 306 from the common liquid chamber 310 by surface tension to fill the individual liquid chamber 306. Finally, the negative pressure defined by the hydraulic head difference between the supply tank and the circulation tank are well balanced with the surface tension of the meniscus, so that the meniscus surface becomes stable and the discharge head gets ready for a next discharge operation.

The method of driving the head is not limited to the above-described procedure (i.e., drawing and pushing) and may be merely of drawing or pushing depending on drive waveform. In addition, in the embodiments described above, a lamination-type piezoelectric element is used as a pressure generator to cause pressure fluctuation to the individual liquid chamber 306, but the pressure generator is not limited thereto. It is possible to use a piezoelectric element having a thin-film like form. Furthermore, it is possible to dispose a heat element in the individual liquid chamber 306 to form bubbles by heat, thereby generating pressure fluctuation, or to utilize electrostatic force to cause pressure fluctuation.

Preferably, the distance between the circulation channel 352, that is in direct contact with the nozzle 304, and the surface of the nozzle plate 301 is 70 μm or less, for adjusting liquid refreshing rate within the nozzle. The distance can be controlled by varying the thickness t of the nozzle plate 301 as illustrated in FIG. 9.

The circulation of the ink can be performed not only during operation of the discharge head but also during stop of the operation. By circulating the ink even during stop of the operation, the ink in the individual liquid chamber is constantly refreshed and agglomeration or sedimentation of the component contained in the ink can be suppressed, which is preferable.

During stop of the operation, the heater disposed in the upstream common liquid chamber 310B may be powered off for an elongated lifespan. As the heater is powered off, the temperature of the ink is decreased while the viscosity of the ink is increased. When the viscosity is increased, the output of the discharge head is preferably increased, because a sufficient ink circulating function cannot be obtained with the normal output of the discharge head at the time of discharge. The temperature-viscosity characteristics of the ink have a wide variety. The output of the discharge head is preferably controlled with reference to a characteristics storage member storing temperature-viscosity characteristics of the ink stored in the composition storage container.

Figure 13:
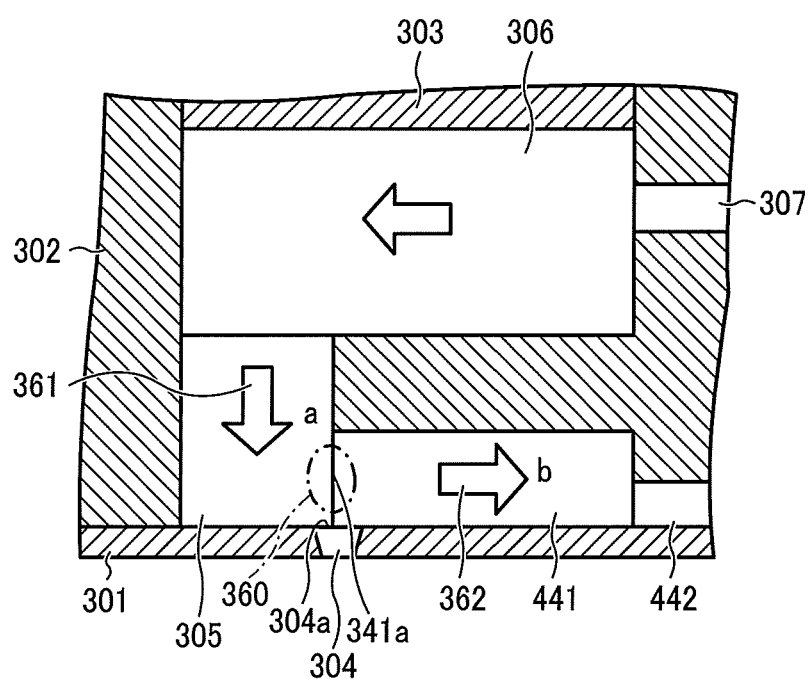
FIG. 13 is a magnified view of a major part of FIG. 7.

Liquid flow and nozzle arrangement in the discharge head are described in detail below with reference to FIG. 13. FIG. 13 is a magnified view of a major part of FIG. 7.

The discharge head includes the individual liquid chamber 306 and the nozzle 304 communicated with each other. The discharge head further includes a nozzle channel 305 and a circulation liquid chamber 441. In the nozzle channel 305, a liquid (ink) flows toward the nozzle 304 side. In the circulation liquid chamber 441, the liquid flows in the direction intersecting (e.g., perpendicular to) the direction of flow of the liquid in the nozzle channel 305.

Here, the direction of flow of the liquid in the nozzle channel 305 is denoted as a first direction a, indicated by an arrow 361 pointing toward the nozzle 304 side from the individual liquid chamber 306 side via the nozzle channel 305. The direction of flow of the liquid in the circulation liquid chamber 441 is denoted as a second direction b, indicated by an arrow 362 drawn along the circulation liquid chamber 441. The first direction a and the second direction b are intersecting each other. In the present embodiment, the nozzle channel 305 and the circulation liquid chamber 441 are arranged so that the first direction a and the second direction b are orthogonal.

The nozzle channel 305 is communicated with an opening 341a disposed on the liquid inflow side of the circulation liquid chamber 441. A liquid-inflow-side opening 304a of the nozzle 304 faces a boundary 360 between the nozzle channel 305 and the circulation liquid chamber 441. A part of the liquid-inflow-side opening 304a faces the nozzle channel 305 and the rest thereof faces the circulation liquid chamber 441.

The liquid-inflow-side opening 304a of the nozzle 304 faces an area (i.e., the boundary 360) where the direction of flow of the liquid changes from the first direction a to the second direction b. This area, facing the liquid-inflow-side opening 304a of the nozzle 304, involves an area where the direction of flow of the whole liquid becomes the second direction b (i.e., an area facing the circulation liquid chamber 441).

As a result, the liquid is supplied from the common liquid chamber 310 to the individual liquid chamber 306 via the fluid resistance part 307 disposed on a supply channel side, and thereafter let to flow from the individual liquid chamber 306 toward the nozzle 304 side via the nozzle channel 305, as illustrated by arrows in FIG. 13.

The direction of flow of the liquid in the nozzle channel 305 is then turned 90 degrees so that the liquid flows into the circulation liquid chamber 441 and thereafter the circulation common liquid chamber 350 via a circulation-channel-side fluid resistance part 442, a discharge channel, and other channels.

During the circulation of the liquid, at the time when the direction of flow of the liquid is changed from the first direction a to the second direction b, the liquid flowing in the first direction a can easily flow into the nozzle 304. Therefore, it is preferable that the nozzle 304 is disposed on one side of the nozzle plate 301 closer to the circulation channel than the center of a part of the nozzle plate which faces the individual liquid chamber.

Figure 14:
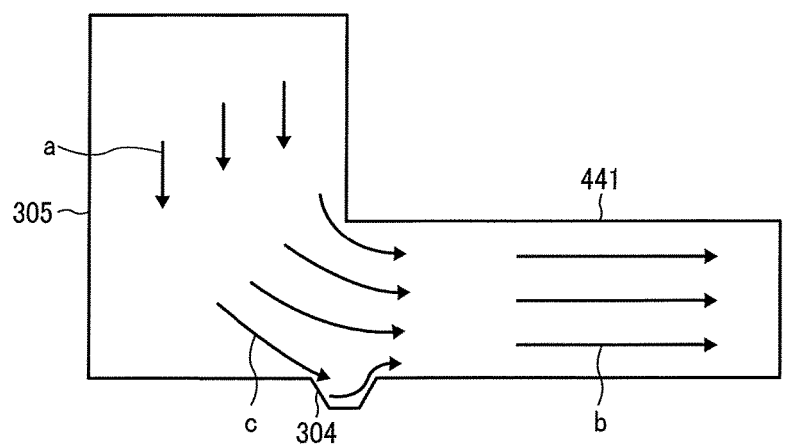
FIG. 14 is an explanatory chart illustrating an ink flow occurring in a discharge head.

FIG. 14 is an explanatory chart illustrating an ink flow occurring in the discharge head.

In FIG. 14, the opening cross-sectional area of the circulation liquid chamber 441 is smaller than that of the nozzle channel 305. Therefore, the flow rate of the liquid in the second direction b is faster than that in the first direction a. Because the nozzle 304 is disposed immediately upstream from a point where the flow rate is increased, the liquid flowing in the first direction a can easily flow into the nozzle 304.

At the same time, due to a liquid flow indicated by arrow c going around from the first direction a to the second direction b, the liquid inside the nozzle 304 can be easily scraped out.

As a result, the liquid inside the nozzle 304 can be easily stirred.

Figure 15:
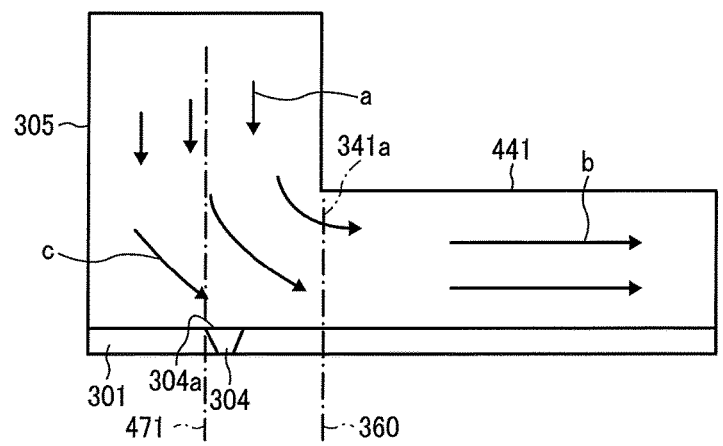
FIG. 15 is an explanatory chart illustrating an ink flow occurring in a discharge head.

FIG. 15 is another explanatory chart illustrating an ink flow occurring in the discharge head.

In FIG. 15, the direction of flow of the liquid in the nozzle channel 305 is denoted as a first direction a, and the direction of flow of the liquid in the circulation liquid chamber 441 is denoted as a second direction b. The first direction a and the second direction b are intersecting each other. The nozzle channel 305 and the circulation liquid chamber 441 are arranged so that the first direction a and the second direction b are orthogonal.

The liquid-inflow-side opening 304a of the nozzle 304 is disposed at a center region 471 with respect to the direction perpendicular to the direction of flow of the liquid in the nozzle channel 305 (i.e., the first direction a).

Because the liquid-inflow-side opening 304a of the nozzle 304 is disposed at the center region 471 with respect to the direction perpendicular to the direction of flow of the liquid in the nozzle channel 305 (i.e., the first direction a), the liquid merely flows so as to touch the inside of the nozzle 304. Therefore, the liquid inside the nozzle 304 can be neither scraped out nor stirred.

As illustrated in FIG. 13, the circulation channel includes the circulation-channel-side fluid resistance part 442 disposed downstream from the nozzle 304 with respect to the direction of flow of the liquid. The fluid resistance of the nozzle 304 is set smaller than that of the circulation-channel-side fluid resistance part 442.

Thus, the efficiency of the energy required for discharging the liquid from the nozzle 304 is improved. In addition, the liquid can flow into the nozzle 304 much easier as the fluid resistance of the nozzle 304 gets smaller.

Preferably, the opening cross-sectional area of the circulation liquid chamber 441 is smaller than that of the nozzle channel 305 in which the liquid flows from the individual liquid chamber 306 toward the nozzle 304. In this case, the flow rate is increased and the liquid can be stirred much easier.

Figure 16:
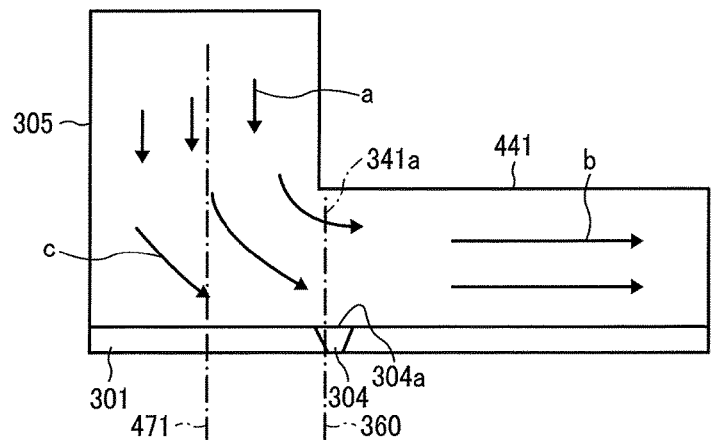
FIG. 16 is an explanatory chart illustrating an ink flow occurring in a discharge head.

FIG. 16 is another explanatory chart illustrating an ink flow occurring in the discharge head.

In FIG. 16, a side wall of the nozzle channel 305 is communicated with the opening 341a disposed on a liquid inflow side of the circulation liquid chamber 441.

The direction of flow of the liquid in the nozzle channel 305 is denoted as a first direction a, and the direction of flow of the liquid in a circulation liquid chamber 441 is denoted as a second direction b. The first direction a and the second direction b are intersecting each other. The nozzle channel 305 and the circulation liquid chamber 441 are arranged so that the first direction a and the second direction b are orthogonal.

The liquid-inflow-side opening 304a of the nozzle 304 is disposed within an area (i.e., the boundary 360) where the direction of flow of the liquid changes from the first direction a to the second direction b.

Even with this configuration, during the circulation of the liquid, at the time when the direction of flow of the liquid is changed from the first direction a to the second direction b, the liquid flowing in the first direction a can easily flow into the nozzle 304 and therefore the liquid inside the nozzle 304 can be easily stirred.

Next, a method for applying a micro vibration to the meniscus portion of an ink at a nozzle opening is described below.

FIGS. 17A to 17D are magnified schematic views of the vicinity of a nozzle opening when a micro vibration is applied thereto. A numeral 420 denotes a water-repellent film.

Preferably, the meniscus portion of an ink at a nozzle opening 421 is vibrated to the degree that the ink is not discharged, at the time when an image forming discharging operation is not performed.

Figure 17A:
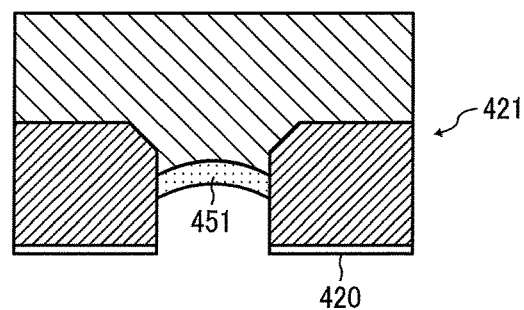
FIGS. 17A to 17D are magnified schematic views of the vicinity of the opening of a nozzle when a micro vibration is applied thereto.
Figure 17B:
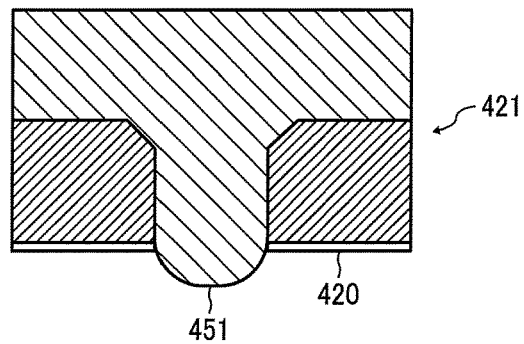
Figure 17C:
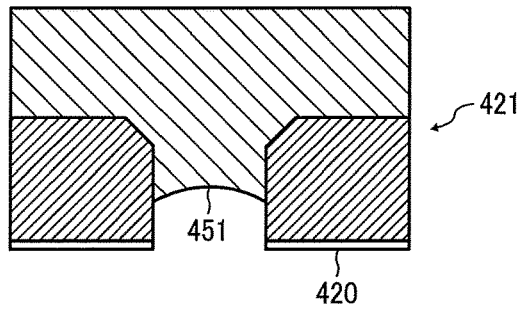

Specifically, a micro vibration is applied to a meniscus portion 451 of the ink while the ink is not discharged from the nozzle opening 421, as illustrated in FIG. 17A, by driving a piezoelectric element with a drive voltage of such a degree that ink droplets are not discharged, as illustrated in FIGS. 17B and 17C.

Figure 17D:
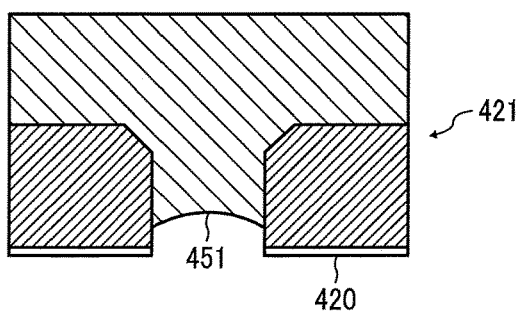

FIG. 17D illustrates a state in which the viscosity of the meniscus portion 451 of the ink has become identical to that of the other parts of the ink due to the micro vibration.

The micro vibration can be applied to the ink meniscus by repeatedly contracting and expanding the ink chamber by applying a voltage of such a degree that the ink is not discharged, to a piezoelectric element.

The micro vibration includes both out-of-print-range micro vibration and within-print-range micro vibration. The out-of-print-range micro vibration oscillates the meniscus when the head is out of the print range, for example, when the head is in the home position or when the carriage is being accelerated or decelerated.

The within-print-range micro vibration oscillates the meniscus at a nozzle in a non-discharging state when the head is in the print range or during printing operation.

In this case, the nozzle in a non-discharging state is detected from a discharge signal and an oscillation signal is selectively imparted to the detected nozzle.

Preferably, the waveform of the micro vibration is a square wave.

Figure 18:
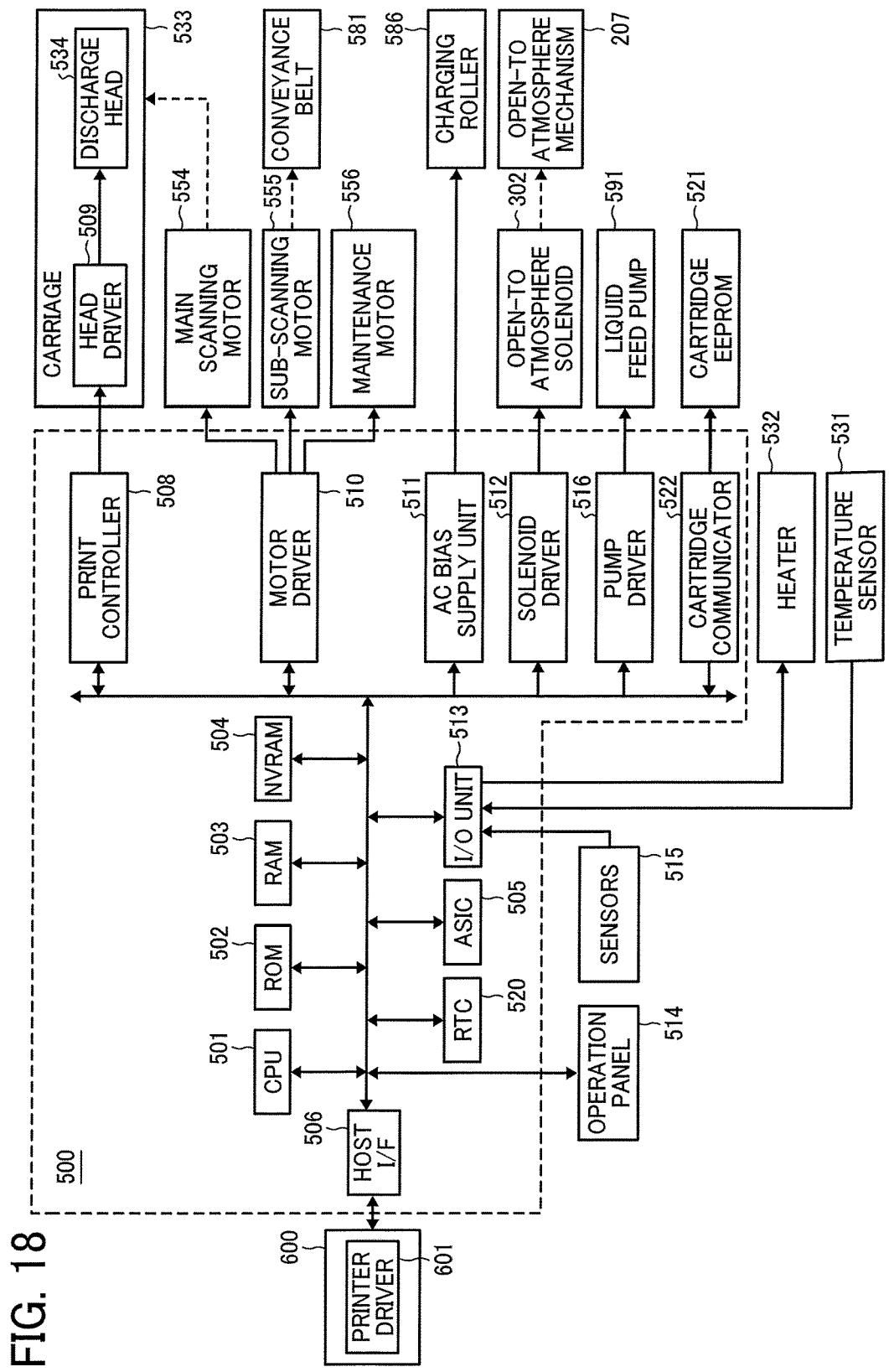
FIG. 18 is a block diagram of a controller of an inkjet recording apparatus in accordance with some embodiments of the present invention.

A controller of the above inkjet recording apparatus is described in detail below with reference to FIG. 18. FIG. 18 is a block diagram of a controller of an inkjet recording apparatus in accordance with some embodiments of the present invention.

A controller 500 includes a CPU (central processing unit) 501, a ROM (read only memory) 502, and a RAM (random access memory) 503. The CPU 501 controls the overall inkjet recording apparatus. The ROM 502 stores fixed data including various programs to be executed by the CPU 501. The RAM 503 temporarily stores data such as image data. The controller 500 further includes an NVRAM (non-volatile random access memory) 504 and an ASIC (application specific integrated circuit) 505. The NVRAM 504 is rewritable even when the apparatus is powered off, for maintaining data. The ASIC 505 executes various signal processings for image data, image processings such as rearrangement, and input and output signal processings for controlling the overall apparatus.

The controller 500 further includes a print controller 508 including a data transmitter and a driving signal generator for driving and controlling a discharge head 534. A head driver (driver IC) 509 for driving the discharge head 534 is mounted on a carriage 533. The controller 500 further includes a motor driver 510 that drives a main scanning motor 554, a sub-scanning motor 555, and a maintenance motor 556. The main scanning motor 554 moves the carriage 533. The sub-scanning motor 555 moves the peripheral surface of a conveyance belt 581. The maintenance motor 556 moves caps and wipers of a maintenance unit and drives a suction pump. The controller 500 further includes an AC bias supply unit 511, a solenoid driver 512, a pump driver 516, and a cartridge communicator 522. The AC bias supply unit 511 supplies AC bias to a charging roller 586. The solenoid driver 512 includes an open-to-atmosphere solenoid 302 that drives an open-to-atmosphere mechanism 207. The pump driver 516 drives a liquid feed pump 591. The cartridge communicator 522 drives a cartridge EEPROM (electrically erasable programmable read-only memory) 521.

The controller 500 is connected to an operation panel 514 through which necessary information is input or displayed.

The controller 500 further includes a host I/F (interface) 506 for transmitting and receiving data or signals to/from a host 600, such as an information processor (e.g., personal computer), an image reader, and an imaging device, via a cable or network.

In the controller 500, the CPU 501 reads out print data from a receive buffer in the host I/F 506 and analyzes the print data. The ASIC 505 executes necessary image processings or rearrangement of data to obtain image data. The image data is transferred from the print controller 508 to the head driver 509. Either a printer driver 601 in the host 600 or the controller 500 can create dot pattern data for outputting an image. The controller 500 further includes an RTC (real-time clock) 520.

The print controller 508 transfers the image data to the head driver 509 as serial data. The print controller 508 also outputs transfer clock, latch signal, and control signal to the head driver 509 that are needed for transferring the image data and confirming the transfer. The print controller 508 includes a D/A (digital-to-analog) converter and a driving signal generator including a voltage amplifier and a current amplifier. The D/A converter executes a D/A conversion of pattern data of driving pulse stored in the ROM 502. The print controller 508 generates a drive waveform consisting of single drive pulse or multiple drive pulses, and outputs the drive waveform to the head driver 509.

The head driver 509 selects one or more drive pulses from the drive waveform received from the print controller 508, based on serially-input image data corresponding to one line of the discharge head 534, and imparts the selected drive pulses to a piezoelectric member serving as a pressure generator of the discharge head 534, thus driving the discharge head 534. The size of dots is determined by the size of liquid droplets. The size of liquid droplets is determined depending on whether all or part of the drive pulses composing the drive waveform are/is selected, or all or part of wave components composing the drive pulse are/is selected.

An I/O (input/output) unit 513 acquires information from various sensors 515 mounted on the inkjet recording apparatus and extracts information needed for controlling the apparatus. The extracted information is used for controlling the print controller 508 that drives the carriage 533, the motor driver 510, and the AC bias supply unit 511 that drives the charging roller 586. The sensors 515 include an optical sensor for detecting the position of a sheet, a thermistor for monitoring the inner temperature of the apparatus, a sensor for monitoring the voltage of a charging belt, and an interlock switch for detecting opening and closing of a cover. The I/O unit 513 is capable of processing various information acquired from the sensors 515. The I/O unit 513 acquires information from a temperature sensor 531 and controls a heater 532 based on the information.

Image Forming Method and Image Forming Apparatus

An image forming method in accordance with some embodiments of the present invention may be performed using an active energy ray and/or while applying heat.

The image forming method in accordance with some embodiments of the present invention includes at least a process of emitting an active energy ray to the curable composition to cure the curable composition. An image forming apparatus in accordance with some embodiments of the present invention includes at least an emitter to emit an active energy ray to the curable composition and a storage to store the curable composition. The storage may include a container. The image forming method may further include a process of discharging the curable composition. The image forming apparatus may further include a discharger to discharge the curable composition. The discharging process may be of a continuous injection type or an on-demand type, but is not limited thereto. Examples of the on-demand type include piezo type, thermal type, and electrostatic type.

FIG. 1 is a schematic view of an image forming apparatus 29 including an inkjet discharger. This image forming apparatus 29 includes printing units 23a, 23b, 23c, and 23d and a supply roller 21. The printing units 23a, 23b, 23c, and 23d include respective discharge heads and respective ink cartridges containing respective active energy ray curable inks having yellow, magenta, cyan, and black colors. The inks are discharged to a recording medium 22 supplied by the supply roller 21. Light sources 24a, 24b, 24c, and 24d emit active energy rays to the respective inks on the recording medium 22 to cause the inks to cure and form color images. The recording medium 22 is then conveyed to a winding roller 26 via a processing unit 25. Each of the printing units 23a, 23b, 23c, and 23d may be equipped with a heater for liquefying the ink at an ink discharging part. Furthermore, the printing units 23a, 23b, 23c, and 23d may be equipped with a cooler for cooling the recording medium to room temperature with or without contacting the recording medium. The inkjet recording process of this image forming apparatus may employ either a serial method or a line method. In the serial method, ink is discharged from a moving discharge head onto a recording medium that is intermittently moved in accordance with the width of the discharge head. In the line method, ink is discharged from a fixed discharge head onto a recording medium that is continuously moved.

The recording medium 22 may be made of paper, film, metal, or a composite material thereof, each of which may be in the form of a sheet. In addition, the recording medium may be applicable to either one-side printing or duplex printing. The recording medium is not limited to articles used as typical recording media. Examples of articles usable as the recording medium include cardboard, building materials (such as wall paper and floor material), concrete, cloth for apparel (such as T-shirts), textile, and leather as the recording medium.

According to some embodiments, active energy rays emitted from the light sources 24a, 24b, and 24c may be weakened or omitted, and an active energy ray may be emitted from the light source 24d after multiple color images have been printed. In this case, energy consumption and cost can be reduced.

Recorded matters recorded by the above ink include those printed on smooth surfaces such as normal paper and resin films, those printed on irregular surfaces, and those printed on surfaces of various materials such as metal and ceramics. By laminating two-dimensional images, a partially-three-dimensional image (including two-dimensional parts and three-dimensional parts) or a three-dimensional object can be obtained.

FIG. 2 is a schematic view of a three-dimensional image forming apparatus in accordance with some embodiments of the present invention, as described above. Referring to FIG. 2, an image forming apparatus 39 includes a discharge head unit 30 for forming object layers, discharge head units 31 and 32 for forming support layers, and ultraviolet emitters 33 and 34 disposed adjacent to the discharge head units 30, 31, and 32. Each of the discharge head units 30, 31, and 32 includes an inkjet head and is movable in the directions indicated by arrows A and B in FIG. 2. The discharge head unit 30 discharges a first curable composition, and the discharge head units 31 and 32 each discharge a second curable composition different from the first curable composition. The ultraviolet emitters 33 and 34 cure the curable compositions. The cured products are laminated in the image forming apparatus 39. More specifically, first, the second curable composition is discharged from the discharge head units 31 and 32 onto an object supporting substrate 37 and exposed to an active energy ray to cure, thus becoming a first support layer having a reservoir. Next, the first curable composition is discharged from the discharge head unit 30 onto the reservoir and exposed to an active energy ray to cure, thus becoming a first object layer. These processes are repeated multiple times, in accordance with the set number of lamination, while lowering a stage 38 that is movable in the vertical direction, to laminate the support layers and the object layers. Thus, a three-dimensional object 35 is obtained. A support layer lamination 36 is removed thereafter, if necessary. In the embodiment illustrated in FIG. 2, the number of discharge head unit 30 for forming object layers is one. Alternatively, the number thereof may be two or more.

Printer

The printer in accordance with some embodiments of the present invention includes an ink film forming device configured to form an ink film and a photo-curing device configured to cure the ink film. The ink film forming device includes the above inkjet recording apparatus.

The ink film forming device is not particularly limited in configuration so long as the inkjet recording apparatus is included therein.

The photo-curing device is not particularly limited in configuration.

Method for Manufacturing Cured Product

A method for manufacturing cured product in accordance with some embodiments of the present invention includes circulating a curable ink comprising a polymer having a polyester structural unit within a circulation channel in an individual liquid chamber disposed in a discharge head; discharging the curable ink from a nozzle disposed in the discharge head to form an ink film; and curing the ink film.

EXAMPLES

Further understanding can be obtained by reference to certain specific examples which are provided herein for the purpose of illustration only and are not intended to be limiting.

Stimulus index and viscosity were measured in the following manner.

Measurement of Stimulus Index (SI)

Stimulus index (SI) was measured by a skin sensitization test according to the LLNA (Local Lymph Node Assay) as follows.

Test Materials

Positive Control

As a positive control, α-hexyl cinnamaldehyde (HCA, product of Wako Pure Chemical Industries, Ltd.) was used.

Medium

As a medium, a mixture liquid of acetone (product of Wako Pure Chemical Industries, Ltd.) and olive oil (product of Fudimi Pharmaceutical Co., Ltd.) in a volume ratio of 4/1 was used.

Animals Used

Before treated with the test materials, the positive control, or the medium control, female mice were acclimated for 8 days including 6-day quarantine. No abnormalities were found in all the mice (used animals) during the quarantine/acclimation period.

Based on the body weights measured 2 days before the initiation of sensitization, they were categorized into 2 groups (4 mice/group) by the body weight stratified random sampling method so that the body weight of each individual was within ±20% of the average body weight of all the individuals. Each of the used animals was 8 weeks old to 9 weeks old at the time of the initiation of sensitization. The individuals remaining after the categorization were excluded from the test.

The used animals were individually identified by application of oil ink to their tale throughout the test period, and also their cages were labeled for identification.

Housing Environment

Throughout the housing period including the quarantine/acclimation period, the used animals were housed in an animal room with barrier system, which was set as follows: 21° C. to 25° C. in temperature, 40% to 70% in relative humidity, 10 to 15 times/hour in frequency of air circulation, and a 12 hour-interval lighting cycle (lighting from 7:00 to 19:00).

The housing cages used were those made of polycarbonate, and four animals were housed in each cage.

The used animals were given ad libitum solid feed for laboratory animals MF (product of Oriental Yeast Co., Ltd.). Also, using a water-supply bottle, the used animals were given ad libitum tap water in which sodium hypochlorite (PURELOX, product of OYALOX Co., Ltd.) had been added so that the chlorine concentration was about 5 ppm. Bedding used was SUNFLAKE (fir tree, shavings obtained with a power planer) (product of Charles River Inc.). The feed and all of the feeding equipment were sterilized with an autoclave (121° C., 30 min) before use.

The housing cage and the bedding were replaced with new ones at the times of the categorization and the removal of the auricular lymph node (i.e., the time when the animals were transferred from the animal room), and the water-supply bottle and rack were replaced with new ones at the time of the categorization.

Test Method

Group Composition

The group compositions of the medium control group and positive control group used for the measurement of ST are shown in Table 1.

TABLE 1

| Test group | Sensitization substance | Sensitization dose (μL/auricle) | Times of sensitization | Number of animals (Animal No.) |
|---|---|---|---|---|
| Medium control group | Medium only | 25 | Once/day × 3 days | 4 (1-4) |
| Positive control group | 25.0% HCA | 25 | Once/day × 3 days | 4 (5-8) |

Preparation

Test Substance

Table 2 shows the amount of the test substance. The test substance was weighed in a measuring flask, and the volume of the test substance was adjusted to 1 mL with the medium. The thus-prepared test substance preparation was placed in a light-shielded airtight container (made of glass).

TABLE 2

| | Concentration after adjustment (w/v %) | Mass of test substance (g) |
|---|---|---|
| Test substance | 50.0 | 0.5 |

Positive Control

About 0.25 g of HCA was accurately weighed, and the medium was added to the HCA to have the volume of 1 mL, to thereby prepare a 25.0% by weight/volume solution. The thus-prepared positive control substance preparation was placed in a light-shielded airtight container (made of glass).

BrdU

In a measuring flask, 200 mg of 5-bromo-2'-deoxyuridine (BrdU, product of NACALAI TESQUE, INC.) was accurately weighed in a measuring flask. Then, physiological saline (product of OTSUKA PHARMACEUTICAL CO., LTD.) was added to the measuring flask, and dissolved through application of ultrasonic waves. Thereafter, the volume of the resultant solution was adjusted to 20 mL to prepare a 10 mg/mL solution (BrdU preparation). The BrdU preparation was sterilized through filtration with a sterilized filtration filter and placed in a sterilized container.

Preparation Day and Storage Period

The positive control preparation was prepared on the day before the initiation of sensitization, and stored in a cold place except in use. The medium and the test substance preparations were prepared on the day of sensitization. The BrdU preparation was prepared 2 days before administration and stored in a cold place until the day of administration.

Sensitization and Administration of BrdU

Sensitization

Each (25 μL) of the test substance preparations, the positive control preparation, or the medium was applied to both the auricles of each of the used animals using a micropipetter. This treatment was performed once a day for three consecutive days.

Administration of BrdU

About 48 hours after the final sensitization, the BrdU preparation (0.5 mL) was intraperitoneally administered once to each of the used animals.

Observation and Examination

General Conditions

All the used animals used for the test were observed once or more times a day from the day of the initiation of sensitization to the day of the removal of the auricular lymph node (i.e., the day when the animals were transferred from the animal room). Notably, the observation day was counted from the day of the initiation of sensitization being regarded as Day 1.

Measurement of Body Weights

The body weight of each of the used animals was measured on the day of the initiation of sensitization and on the day of the removal of the auricular lymph node (i.e., the day when the animals were transferred from the animal room). Also, the average of the body weights and the standard error thereof were calculated for each group.

Removal of Auricular Lymph Node and Measurement of Weight Thereof

About 24 hours after the administration of BrdU, the used animals were allowed to undergo euthanasia, and their auricular lymph nodes were sampled. The surrounding tissue of each auricular lymph node was removed, and the auricular lymph nodes from both the auricles were collectively weighed. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.

Measurement of BrdU Intake

After returning the auricular lymph nodes to room temperature, the auricular lymph nodes were mashed with the gradual addition of physiological saline, and suspended therein. The thus-obtained suspension was filtrated and then dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.

Evaluation of Results

Calculation of Stimulation Index (SI)

As shown in the following formula, the measurement of BrdU intake for each individual was divided by the average of the measurements of BrdU intake in the medium control group to calculate the SI value for the individual. The SI value of each test group was the average of the SI values of the individuals. Also, the standard error of the SI values was calculated for each test group. Notably, the SI value was rounded at the second decimal place and shown to the first decimal place.

$$SI = \frac{\text{Average of measurements of } BrdU \text{ intake for each individual (average of 3 wells)}}{\text{Average of measurements of } BrdU \text{ intake in the } mediumcontrol \text{ group (average of 4 animals)}}$$

Measurement of Viscosity

The viscosity of each ink at 25° C. was measured with a cone-plate rotary viscometer (VISCOMETER TVE-22L available from Toki Sangyo Co., Ltd.) using a cone rotor (1° 34'×R24) while setting the revolution to 50 rpm and the temperature of the constant-temperature circulating water to 25° C. The temperature of the circulating water was adjusted by an instrument VISCOMATE VM-150III.

Ink Preparation Example 1

Preparation of Ink 1

An ink 1 was prepared by stir-mixing 70 parts by mass of t-butyl acrylate (available from Osaka Organic Chemical Industry Ltd.), 30 parts by mass of ethylene-oxide-modified trimethylolpropane triacrylate (available from Shin Nakamura Chemical Co., Ltd.), 10 parts by mass of 1-hydroxy-cyclohexyl phenyl ketone (available from BASF), and 10 parts by mass of a polymer 1 (VYLON® 802 available from Toyobo Co., Ltd., having a number average molecular weight of 3,000, a hydroxyl value of 37 mgKOH/g, and an acid value less than 1 mgKOH/g) having a polyester structural unit.

Ink Preparation Examples 2 to 10

Preparation of Inks 2 to 10

The procedure in Ink Preparation Example 1 was repeated except for changing the composition according to Tables 3 and 4, thus preparing inks 2 to 10. Each composition is shown in Tables 3 and 4.

TABLE 3

| | | | | Ink No. | | | | | |
|---|---|---|---|---|---|---|---|---|---|
| | | | | 1 | 2 | 3 | 4 | 5 | 6 |
| Polymerizable Monomers | Monofunctional Acrylates and Methacrylates | t-Butyl acrylate | 70 | — | — | — | 70 | 70 |
| | | t-Butyl methacrylate | — | 60 | — | — | — | — |
| | | n-Pentyl methacrylate | — | — | 85 | — | — | — |
| | | n-Hexyl methacrylate | — | — | — | 50 | — | — |
| | Polyfunctional Acrylates and Methacrylates | Ethylene-oxide-modified trimethylolpropane triacrylate | 30 | — | — | — | — | 30 |
| | | Glycerol dimethacrylate | — | 40 | — | — | — | — |
| | | Tricyclodecane dimethanol dimethacrylate | — | — | 15 | — | — | — |
| | | Ethylene-oxide-modified trimethylolpropane trimethacrylate | — | — | — | 50 | — | — |
| | | Caprolactone-modified dipentaerythritol hexaacrylate | — | — | — | — | 30 | — |
| Polymerization Initiators | | 1-Hydroxy-cyclohexyl phenyl ketone | 10 | 5 | 15 | 10 | 10 | 10 |
| | | 2-Dimethylamino-2-(4-methylbenzyl)-1-(4-morpholine-4-yl-phenyl)butane-1-one | — | — | — | — | — | — |

TABLE 3-continued

| | | Ink No. | | | | | |
|---|---|---|---|---|---|---|---|
| | | 1 | 2 | 3 | 4 | 5 | 6 |
| Polymers Having Polyester Structural Unit | Polymer 1 having a polyester structural unit | 10 | 5 | 20 | 15 | 10 | — |
| | Polymer 2 having a polyester structural unit | — | — | — | — | — | 10 |
| White Pigments | Titanium oxide | — | — | — | — | — | — |
| | Zinc oxide | — | — | — | — | — | — |
| Viscosity at 25° C. (mPa · s) | | 20 | 25 | 15 | 35 | 22 | 25 |

TABLE 4

| | | | Ink No. | | | |
|---|---|---|---|---|---|---|
| | | | 7 | 8 | 9 | 10 |
| Polymerizable Monomers | Monofunctional Acrylates and Methacrylates | t-Butyl acrylate | 70 | 70 | 70 | — |
| | | t-Butyl methacrylate | — | — | — | 60 |
| | | n-Pentyl methacrylate | — | — | — | — |
| | | n-Hexyl methacrylate | — | — | — | — |
| | Polyfunctional Acrylates and Methacrylates | Ethylene-oxide-modified trimethylolpropane triacrylate | 30 | 30 | 30 | — |
| | | Glycerol dimethacrylate | — | — | — | 40 |
| | | Tricyclodecane dimethanol dimethacrylate | — | — | — | — |
| | | Ethylene-oxide-modified trimethylolpropane trimethacrylate | — | — | — | — |
| | | Caprolactone-modified dipentaerythritol hexaacrylate | — | — | — | — |
| Polymerization Initiators | | 1-Hydroxy-cyclohexyl phenyl ketone | — | 10 | 10 | 10 |
| | | 2-Dimethylamino-2-(4-methylbenzyl)-1-(4-morpholine-4-yl-phenyl)butane-1-one | 10 | — | — | — |
| Polymers Having Polyester Structural Unit | | Polymer 1 having a polyester structural unit | — | 10 | 10 | 5 |
| | | Polymer 2 having a polyester structural unit | 10 | — | — | — |
| White Pigments | | Titanium oxide | — | 15 | — | — |
| | | Zinc oxide | — | — | 15 | — |
| Viscosity at 25° C. (mPa · s) | | | 21 | 20 | 20 | 25 |

The product names and manufacturers of the materials described in Tables 3 and 4 are listed below.

It is to be noted that a numerical value in brackets added to the end of each material represents SI measured by the LLNA test. In a case in which the word "Negative" or "None" appears in the brackets, it means that the material is evaluated as being negative in skin sensitizing property or having no skin sensitizing property by a test method according to the above-described document (i.e., Contact Dermatitis, 8, 223-235, 1982) or in Material Safety Data Sheet (MSDS). In the case in which the word "Positive" appears in the brackets, it means that the material has a problem in skin sensitizing property which should be added with the risk phrase code R43 (May cause sensitisation by skin contact) defined by the European Union or the risk phrase code H317 (May cause an allergic skin reaction) defined in the CLP Regulation. It is to be noted that polymer component typically have no skin sensitizing property because they are difficult to permeate the skin due to their high molecular weights.

—Monofunctional Acrylates and Methacrylates— t-Butyl acrylate: available from Osaka Organic Chemical Industry Ltd. under the trade name of "t-Butyl Acrylate". (Positive)

t-Butyl methacrylate: available from Mitsubishi Rayon Co., Ltd. under the trade name of "ACRYESTER TB". (Negative, when evaluated by Maximization test method according to the document.)

n-Pentyl methacrylate: available from Zhangjiagang Render Chemical Co., Ltd. under the trade name of "n-Amyl Methacrylate". (Negative, when evaluated by Maximization test method according to the document.)

n-Hexyl methacrylate: available from Tokyo Chemical Industry Co., Ltd. under the trade name of "n-Hexyl Methacrylate". (Negative, when evaluated by Maximization test method according to the document.)

—Polyfunctional Acrylates and Methacrylates—

Ethylene-oxide-modified trimethylolpropane triacrylate: available from Shin-Nakamura Chemical Co., Ltd. under the trade name of "A-TMPT-3EO". (Positive)

Glycerol dimethacrylate: available from Shin-Nakamura Chemical Co., Ltd. under the trade name of "701". (1.2)

Tricyclodecane dimethanol dimethacrylate: available from Shin-Nakamura Chemical Co., Ltd. under the trade name of "DCP". (1.3)

Ethylene-oxide-modified trimethylolpropane trimethacrylate: available from Shin-Nakamura Chemical Co., Ltd. under the trade name of "TMPT-3EO". (1.0)

Caprolactone-modified dipentaerythritol hexaacrylate: available from Nippon Kayaku Co., Ltd. (Negative, when evaluated by a test method based on OECD Test Guideline 406 in MSDS.)

—Photoradical Polymerization Initiators Negative in Skin Sensitizing Property—

1-Hydroxy-cyclohexyl phenyl ketone: available from BASF under the trade name of "IRGACURE 184". (None, when evaluated by a test method based on OECD Test Guideline 406 in MSDS.)

2-Dimethylamino-2-(4-methylbenzyl)-1-(4-morpholine-4-yl-phenyl)butane-1-one: available from BASF under the trade name of "IRGACURE 379". (None, when evaluated by a test method based on OECD Test Guideline 406 in MSDS.)

—Polymers Having Polyester Structural Unit—

Polymer 1 having a polyester structural unit; available from Toyobo Co., Ltd. under the trade name of VYLON® 802, having a number average molecular weight of 3,000, a hydroxyl value of 37 mgKOH/g, and an acid value less than 1 mgKOH/g.

Polymer 2 having a polyester structural unit; available from Toyobo Co., Ltd. under the trade name of VYLON® GK810, having a number average molecular weight of 6,000, a hydroxyl value of 19 mgKOH/g, and an acid value of 5 mgKOH/g.

—White Pigments—

Titanium oxide: available from Tayca Corporation under the trade name of "JR403".

Zinc oxide: available from Nippon Chemical Industrial Co., Ltd. under the trade name of "Pigment White 4".

Example 1

The ink 1 was sealed in an aluminum pouch bag having the configuration illustrated in FIG. 4 so that no bubble entered the pouch bag. The pouch bag filled with the ink 1 was accommodated in a composition storage container made of plastic having the configuration illustrated in FIG. 5. The composition storage container was accommodated in a casing, and an ink flow channel connecting the composition storage container and a discharge head (GEN5 head available from Ricoh Industry Company, Ltd.) and a temperature sensor were arranged in the casing. The average thickness t (illustrated in FIG. 9) of the nozzle plate 301 of the discharge head was 50 μm. A circulation operation was performed by sucking the circulation tank by a vacuum pump. A micro drive operation was performed by applying a voltage of such a degree that ink was not discharged, to a piezoelectric element, to repeatedly contract and expand the ink chamber to oscillate the ink meniscus. Thus, the inkjet recording apparatus of Example 1 was prepared.

Examples 2 to 12 and Comparative Examples 1 to 5

The procedure in Example 1 was repeated except for changing the type of ink, the average thickness of the nozzle plate of the discharge head, the circulation channel, and the micro drive operation according to Table 5. Thus, inkjet recording apparatuses of Examples 2 to 12 and Comparative Examples 1 to 5 were prepared.

Discharge stability and hiding power were evaluated as follows. The evaluation results are shown in Table 5.

Evaluation of Discharge Stability

Each ink was stored in the container illustrated in FIG. 4 and then supplied to the discharge head by a supply operation. Immediately after the discharge head filled with the ink had been left to stand at 50° C. (assuming non-air-conditioned environment in summer) for 24 hours, an image was output using all the nozzles. The number of nozzles failed to discharge the ink (hereinafter "misfiring nozzles") was counted. The discharge head was then recovered by being applied with 100 pulses of a voltage that is 120% of the voltage applied to the piezoelectric element during the printing operation, to forcibly discharge the ink. The number of misfiring nozzles after the recovery of the discharge head was counted. The evaluation results are shown in Table 5.

The strength of recovery can be controlled by varying the applied voltage and the number of pulses. Alternatively, the recovery may also be performed by detaching the tube of the supply unit and sending the air to the head by a syringe, so that the ink is forcibly ejected by air pressure.

Evaluation of Hiding Power

Each active energy ray curable composition (ink) was formed into a solid image having an area of 10 cm×10 cm on a recording medium (COSMOSHINE A4300 available from Toyobo Co., Ltd., a coated transparent PET film having an average thickness of 100 μm) using a test printer (prepared by modifying a printer SG7100 available from Ricoh Co., Ltd.) at a discharge temperature described in Table 5. The solid image was exposed to light having a wavelength in UVA region, emitted from a UV emitter LH6 (D Bulb) available from Fusion UV Systems Japan K.K., under the light condition of 0.2 mW/cm$^2$ and 3,000 mJ/cm$^2$. Thus, an image (cured product) having an average thickness of 10 μm and an area of 10 cm×10 cm was obtained.

The image (cured product) was subject to a measurement of a density relative to black color by a reflective spectrodensitometer (X-Rite 939 available from X-Rite), with a black paper sheet (EXTRA BLACK available from Takeo Co., Ltd., having a density of 1.65) put on the other side of the recording medium opposed to the side having the image, to measure the hiding ratio. The hiding ratio was calculated from the following formula (1). The higher the hiding ratio, the higher the hiding power.

Hiding Ratio (%)=[1−(Density of Image(Cured Product)/Density of Black Paper Sheet (1.65))]×100     Formula (1)

TABLE 5

| | | | Discharge Head | | | Evaluation Results | | |
| --- | --- | --- | --- | --- | --- | --- | --- | --- |
| | | | | | | Discharge Stability | | |
| | Ink No. | Average Thickness (t) of Nozzle Plate (μm) | Discharge Temp. (° C.) | Circulation Channel | Micro-drive Operation | Number of Misfiring Nozzles Immediately After Standing | Number of Misfiring Nozzles After Recovery | Hiding Ratio (%) |
| Examples 1 | 1 | 50 | 40 | Yes | Yes | 0 | 0 | — |
| 2 | 2 | 60 | 45 | Yes | Yes | 0 | 0 | — |
| 3 | 3 | 70 | 33 | Yes | Yes | 0 | 0 | — |
| 4 | 4 | 80 | 55 | Yes | Yes | 12 | 0 | — |
| 5 | 5 | 50 | 42 | Yes | No | 5 | 0 | — |
| 6 | 6 | 60 | 45 | Yes | No | 7 | 0 | — |
| 7 | 7 | 80 | 41 | Yes | No | 19 | 0 | — |

TABLE 5-continued

|  | Ink No. | Discharge Head | | | | Evaluation Results | | |
|---|---|---|---|---|---|---|---|---|
|  |  |  |  |  |  | Discharge Stability | | |
|  |  | Average Thickness (t) of Nozzle Plate (μm) | Discharge Temp. (° C.) | Circulation Channel | Micro-drive Operation | Number of Misfiring Nozzles Immediately After Standing | Number of Misfiring Nozzles After Recovery | Hiding Ratio (%) |
|  | 8 | 8 | 50 | 40 | Yes | Yes | 0 | 0 | 88 |
|  | 9 | 9 | 50 | 40 | Yes | Yes | 0 | 0 | 75 |
|  | 10 | 4 | 100 | 55 | Yes | Yes | 50 | 5 | — |
|  | 11 | 6 | 80 | 45 | Yes | No | 40 | 5 | — |
|  | 12 | 7 | 80 | 41 | Yes | No | 30 | 3 | — |
| Comparative Examples | 1 | 1 | 50 | 40 | No | No | 100 | 50 | — |
|  | 2 | 10 | 60 | 45 | No | Yes | 50 | 50 | — |
|  | 3 | 3 | 70 | 33 | No | No | 150 | 100 | — |
|  | 4 | 8 | 60 | 40 | No | No | 100 | 50 | 75 |
|  | 5 | 9 | 50 | 40 | No | No | 80 | 40 | 65 |

It is confirmed from Table 5 that, in Examples 1 to 12 in which a discharge head having a circulation channel was used, each ink had a viscosity of from 15 to 35 mPa·s at 25° C.

It is confirmed from Examples 1 to 3 that no misfiring nozzle occurred when the thickness t of the nozzle plate (i.e., the distance between the surface of the nozzle plate and the circulation channel) was 70 μm or less and the micro drive operation was performed, even without recovery operation. It is confirmed from Example 4 in which the thickness t was 80 μm, misfiring nozzle did occur after the discharge head had been left to stand, even when the micro-drive operation was performed, however, the discharge head was recovered by the recovery operation. It is confirmed from Examples 5 to 7 in which the thickness t was in the specified range and the micro drive operation was not performed, misfiring nozzle did occur after the discharge head had been left to stand, however, the discharge head was recovered by the recovery operation, just the same as in Example 4. In Examples 10 to 12 in which the thickness t was greater and the micro drive operation was performed or not performed, a large number of misfiring nozzles did occur even when the recovery operation was performed. Although details are not described in FIG. 5, it is confirmed that it was impossible to discharge the ink when the thickness t was increased to 150 μm and a circulation channel was present. In Examples 8 and 9 in which the inks were containing titanium oxide and zinc oxide, respectively, whether misfiring nozzle occurred or not was confirmed and hiding power of the cured product was measured after the inks were left to stand under suitable conditions. As a result, it is confirmed that no misfiring nozzle occurred and the hiding power was high.

In Comparative Examples 4 and 5, the respective inks of Examples 8 and 9 were used with a discharge head having no circulation channel. As a result, misfiring nozzle did occur and the discharge head was not recovered by the recovery operation. In addition, it is confirmed that the hiding power was low due to precipitation of titanium oxide and zinc oxide. It is confirmed that zinc oxide more degrades the hiding power than titanium oxide. When comparing Example 9 and Comparative Example 5, it is confirmed that deterioration of hiding power due to precipitation of zinc oxide was more suppressed in Example 9.

Comparative Example 1 is the same as Example 1 except that the discharge head was replaced with a discharge head having no circulation channel. As a result, misfiring nozzle did occur after the discharge head had been left to stand, and the discharge head was not recovered by the recovery operation. Comparative Example 2 is the same as Example 2 except that the discharge head was replaced with a discharge head having no circulation channel. As a result, misfiring nozzle did occur after the discharge head had been left to stand even after the recovery operation, but the number of misfiring nozzles was reduced compared to that in Comparative Example 1. Comparative Example 3 is the same as Example 3 except that the discharge head was replaced with a discharge head having no circulation channel. As a result, a significant number of misfiring nozzles did occur after the discharge head had been left to stand even after the recovery operation.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An inkjet recording apparatus, comprising:
   a curable ink comprising a polymer having a polyester structural unit; and
   a discharge head including:
     an individual liquid chamber including a circulation channel in which the curable ink is circulatable; and
     a nozzle from which the curable ink is dischargeable,
   wherein:
   the circulation channel includes a fluid resistance part that separates a circulation liquid chamber from a circulation common liquid chamber;
   the circulation channel includes a nozzle channel through which the curable ink circulates in a direction parallel to a flow of the curable ink through the nozzle;
   the nozzle channel is adjacent to the circulation liquid chamber through which the curable ink circulates in a direction perpendicular to the flow of the curable ink through the nozzle; and
   the nozzle is located at a boundary of the nozzle channel and the circulation liquid chamber.

2. The inkjet recording apparatus of claim 1, further comprising:
a mechanism configured to perform a micro drive operation at a level that the curable ink is not discharged at a time when an image forming discharging operation is not performed.

3. The inkjet recording apparatus of claim 1, wherein the discharge head further includes:
a nozzle plate having the nozzle,
wherein a distance between the circulation channel and a surface of the nozzle plate is 70 μm or less.

4. The inkjet recording apparatus of claim 3, wherein the nozzle is disposed on a side closer to the circulation channel than the center of a part of the nozzle plate which faces the individual liquid chamber.

5. The inkjet recording apparatus of claim 1, wherein the discharge head further includes:
a temperature sensor.

6. The inkjet recording apparatus of claim 1, wherein the curable ink has a stimulation index less than 3.

7. The inkjet recording apparatus of claim 1, wherein:
the curable ink comprises at least one white pigment selected from the group consisting of titanium oxide, silica, and zinc oxide; and
the white pigment accounts for 5% to 15% by mass of the curable ink.

8. The inkjet recording apparatus of claim 1, wherein the curable ink has a viscosity of from 2 to 150 mPa·s at 25° C.

9. The inkjet recording apparatus of claim 1, further comprising:
a composition storage container storing the curable ink.

10. A printer, comprising:
an ink film forming device configured to form an ink film, the ink film forming device including the inkjet recording apparatus of claim 1; and
a photo-curing device configured to cure the ink film with light.

11. A method for manufacturing cured product, the method comprising:
circulating a curable ink comprising a polymer having a polyester structural unit within a circulation channel in an individual liquid chamber disposed in a discharge head;
discharging the curable ink from a nozzle disposed in the discharge head to form an ink film; and
curing the ink film,
wherein:
the circulation channel includes a fluid resistance part that separates a circulation liquid chamber from a circulation common liquid chamber;
the circulation channel includes a nozzle channel through which the curable ink circulates in a direction parallel to a flow of the curable ink through the nozzle;
the nozzle channel is adjacent to the circulation liquid chamber through which the curable ink circulates in a direction perpendicular to the flow of the curable ink through the nozzle; and
the nozzle is located at a boundary of the nozzle channel and the circulation liquid chamber.

* * * * *